US007822698B1

(12) United States Patent
Cruz-Albrecht et al.

(10) Patent No.: US 7,822,698 B1
(45) Date of Patent: Oct. 26, 2010

(54) SPIKE DOMAIN AND PULSE DOMAIN NON-LINEAR PROCESSORS

(75) Inventors: Jose Cruz-Albrecht, Oak Park, CA (US); Peter Petre, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 813 days.

(21) Appl. No.: 11/726,860

(22) Filed: Mar. 23, 2007

(51) Int. Cl.
*G06J 1/00* (2006.01)
(52) U.S. Cl. .............................. 706/34; 706/35; 706/36
(58) Field of Classification Search .................. 706/34, 706/35, 36; 341/143, 144, 155, 126
See application file for complete search history.

(56) References Cited

U.S. PATENT DOCUMENTS

| 5,345,398 | A | 9/1994 | Lippmann et al. ............. 702/53 |
| 5,479,170 | A | 12/1995 | Cauwenberghs et al. .... 341/200 |
| 5,894,280 | A | 4/1999 | Ginetti et al. ................ 341/118 |
| 6,452,524 | B1 | 9/2002 | Fraleigh et al. ............. 341/143 |
| 6,473,019 | B1 | 10/2002 | Ruha et al. ................... 341/143 |
| 6,975,682 | B2 | 12/2005 | Cosand ........................ 375/247 |
| 7,038,608 | B1 | 5/2006 | Gilbert ........................ 341/144 |
| 7,403,144 | B1 * | 7/2008 | Cruz-Albrecht et al. ..... 341/143 |
| 7,405,686 | B2 | 7/2008 | Laroia et al. ................ 341/143 |

OTHER PUBLICATIONS

Hasler et al ("VLSI Neural Systems and Circuits" 1990 IEEE).*
Wang et al ("Review of pulse-coupled neural networks" 2009).*
Laurent Perrinet ("Emergence of filters from natural scenes in a sparse spike coding scheme" 2004).*
Cruz, J.M., et al., "A 16 × 16 Cellular Neural Network Universal Chip: The First Complete Single-Chip Dynamic computer Array with Distributed Memory and with Gray Scale Input-Output," Analog Integrated Circuits and Signal Processing, 15, 227-237 (1998).
Lazar, A., et al., "Perfect Recovery and Sensitivity Analysis of Time encoded bandlimited signals," IEEE Trans. On circuits and Systems-I, vol. 51, No. 10, pp. 2060-2073 (Oct. 2004).
Dighe, A.M., et al., "An Asynchronous Serial Flash Converter," $9^{th}$ Int. Conf. on Electronics, Circuits and Systems, IEEE, pp. 13-15, 2002.

(Continued)

*Primary Examiner*—Donald Sparks
*Assistant Examiner*—Lut Wong
(74) *Attorney, Agent, or Firm*—Ladas & Parry

(57) ABSTRACT

A neural network has an array of interconnected processors, each processor operating either the pulse domain or spike domain. Each processor has (i) first inputs selectively coupled to other processors in the array of processors, each first input having an associated 1 bit DAC coupled to a summing node, (ii) second inputs selectively coupled to inputs of the neural network, the second inputs having current generators associated therewith coupled to said summing node, (iii) a filter/integrator for generating an analog signal corresponding to current arriving at the summing node, (iv) an optional non-linear element coupled to the filter/integrator, and (v) an analog-to-pulse converter, if the processors operate in the pulse domain, or an analog-to-spike convertor, if the processors operate in the spike domain, for converting an analog signal output by the optional nonlinear element or by the filter/integrator to either the pulse domain or spike domain, and providing the converted analog signal as an unquantized pulse or spike domain signal at an output of the processor. The array of processors are selectively interconnected with either unquantized pulse domain or spike domain signals.

34 Claims, 25 Drawing Sheets

OTHER PUBLICATIONS

D. Donoho, "Compressed Sensing," IEEE Transactions on Information Theory, vol. 42, No. 4, pp. 1289-1306, Apr. 2006.

Iwamoto, M., et al., "Bandpass Delta-Sigma Class-S Amplifier," Electronic Letters, vol. 36, No. 12, pp. 1010-1012, Jun. 2000.

J. Keane and L. Atlas, "Impulses and Stochastic Arithmetic for Signal Processing," Proc. 2001 IEEE International Conference on Acoustics, Speech, and Signal Processing, pp. 1257-1260, 2001.

Roza, E., "Analog to Digital Conversion via Duty Cycle Modulation," IEEE Trans. On Circuits and Systems-II, vol. 44, No. 11, pp. 907-914, Nov. 1997.

Walden, R., "Analog to Digital Converter Survey and Analysis," IEEE Journal on Selected Areas in Communication, vol. 17, No. 4, pp. 539-550, Apr. 1999.

Y. Xia and J. Wang, "A Recurrent Neural Network for Solving Nonlinear Convex Programs Subject to Linear Constraints," IEEE Trans. On Neural Networks, vol. 16, No. 2, Mar. 2005.

U.S. Appl. No. 11/726,484, filed Mar. 22, 2007, Cruz-Albrecht, Jose, et al.

U.S. Appl. No. 60/984,354, filed Oct. 31, 2007, Cruz-Albrecht, Jose.

U.S. Appl. No. 60/984,357, filed Oct. 31, 2007, Petre, Peter.

* cited by examiner

Analog Input    Pulse Output

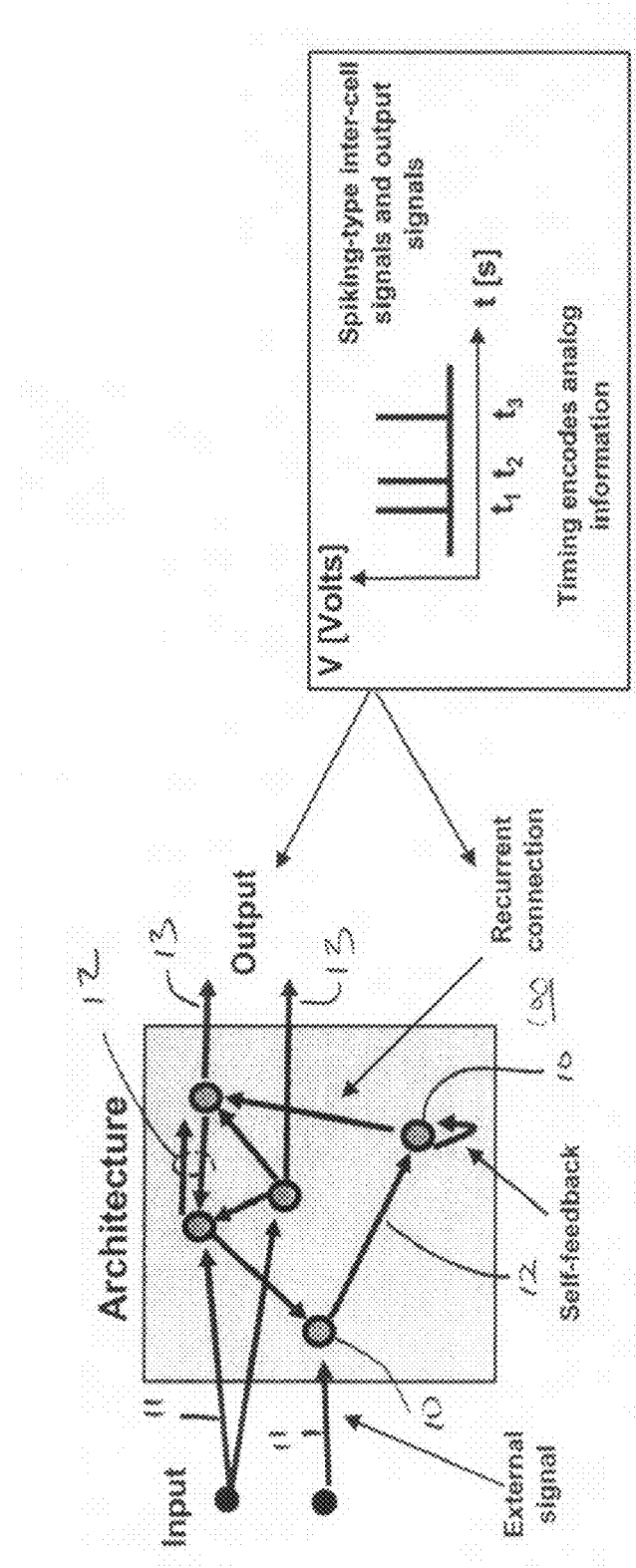
Figure 2a
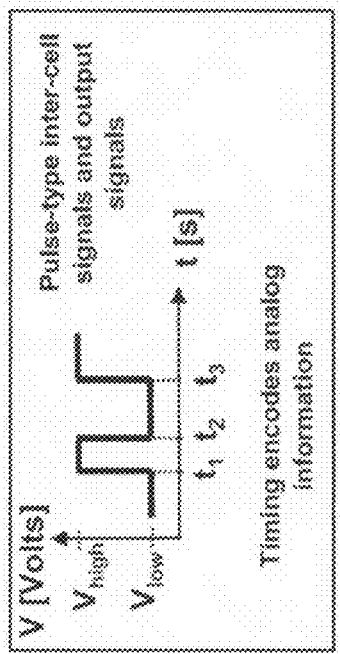
Figure 2b
Figure 2c

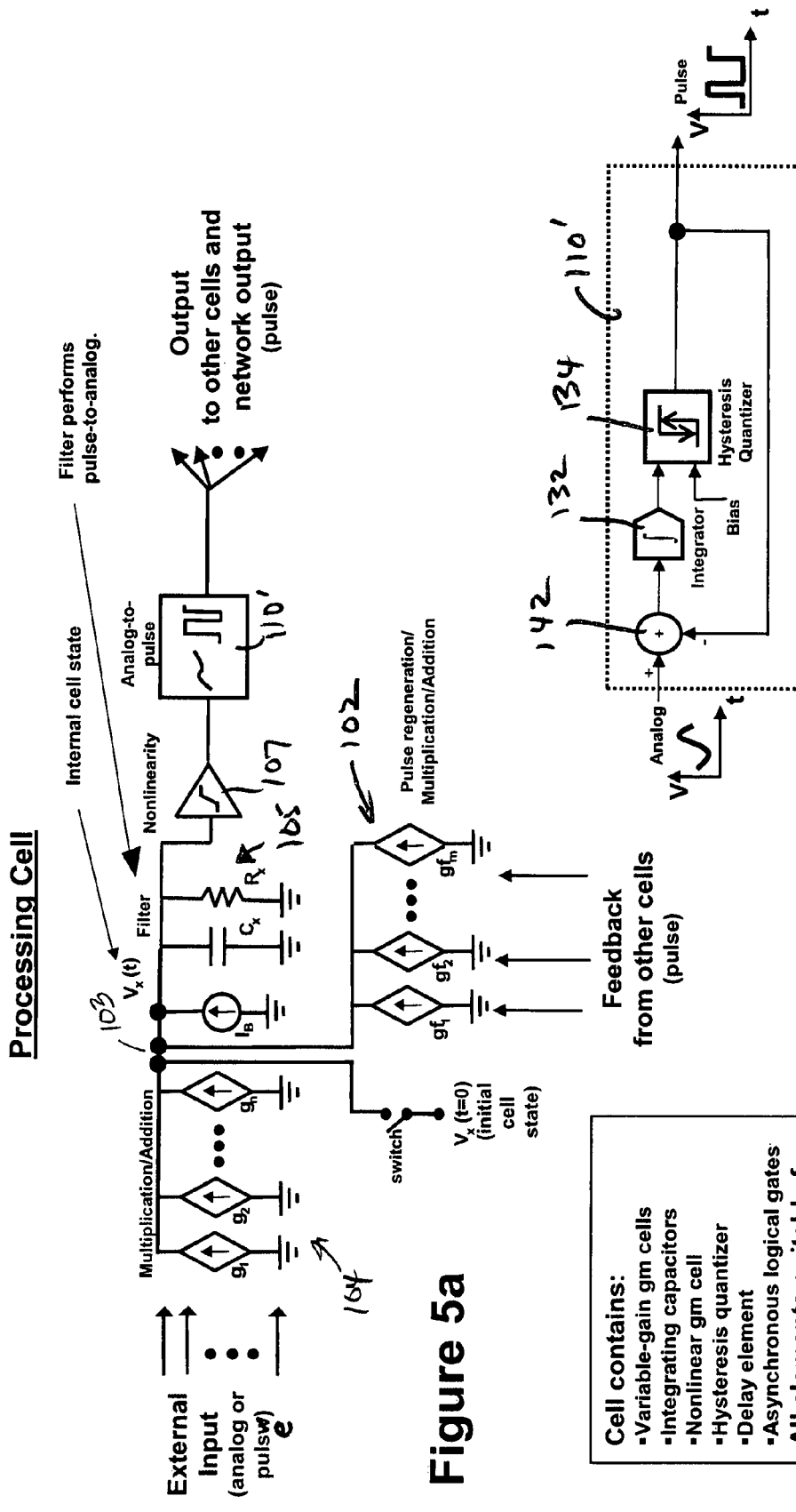

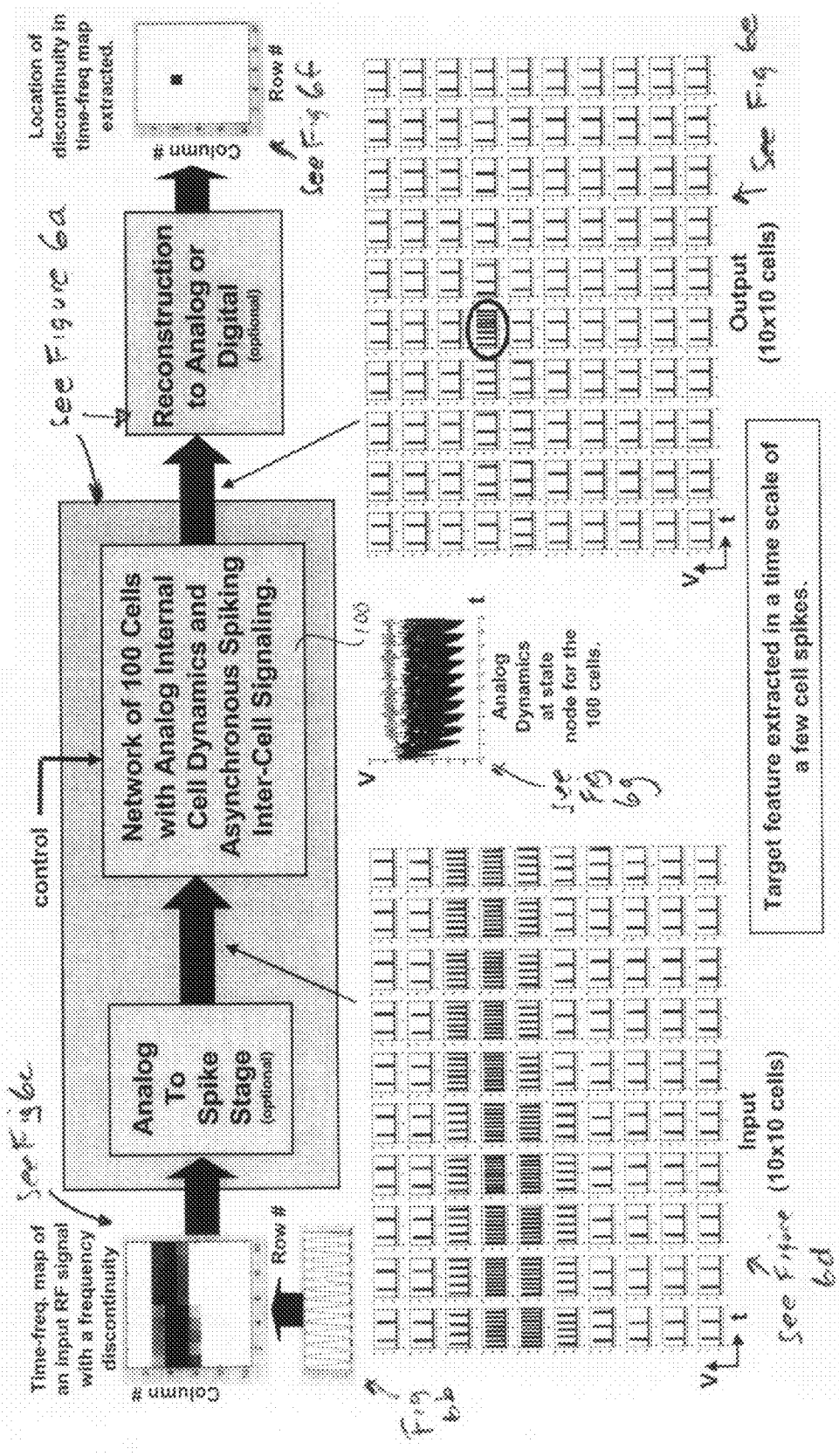

Output (10x10 cells)

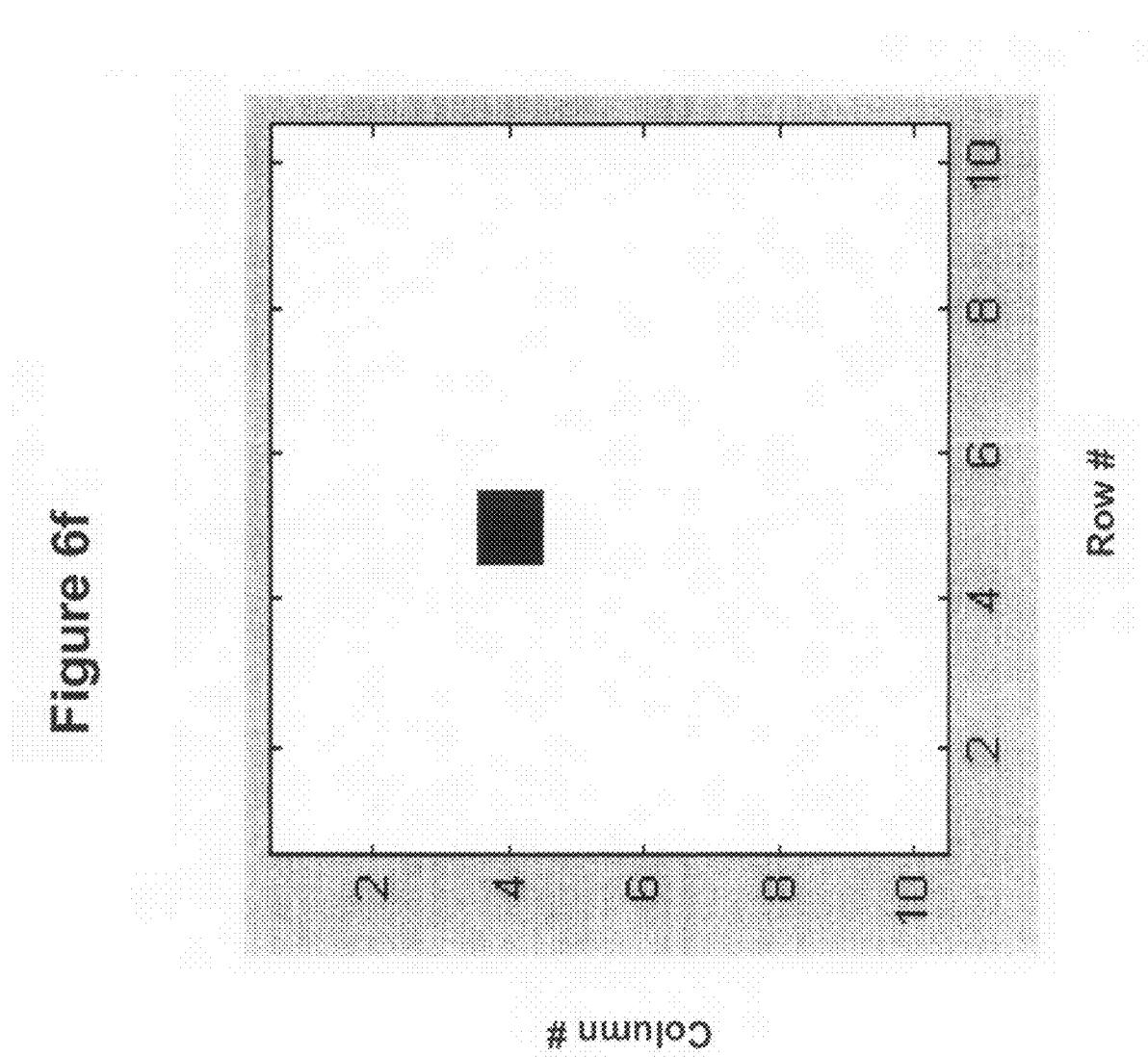

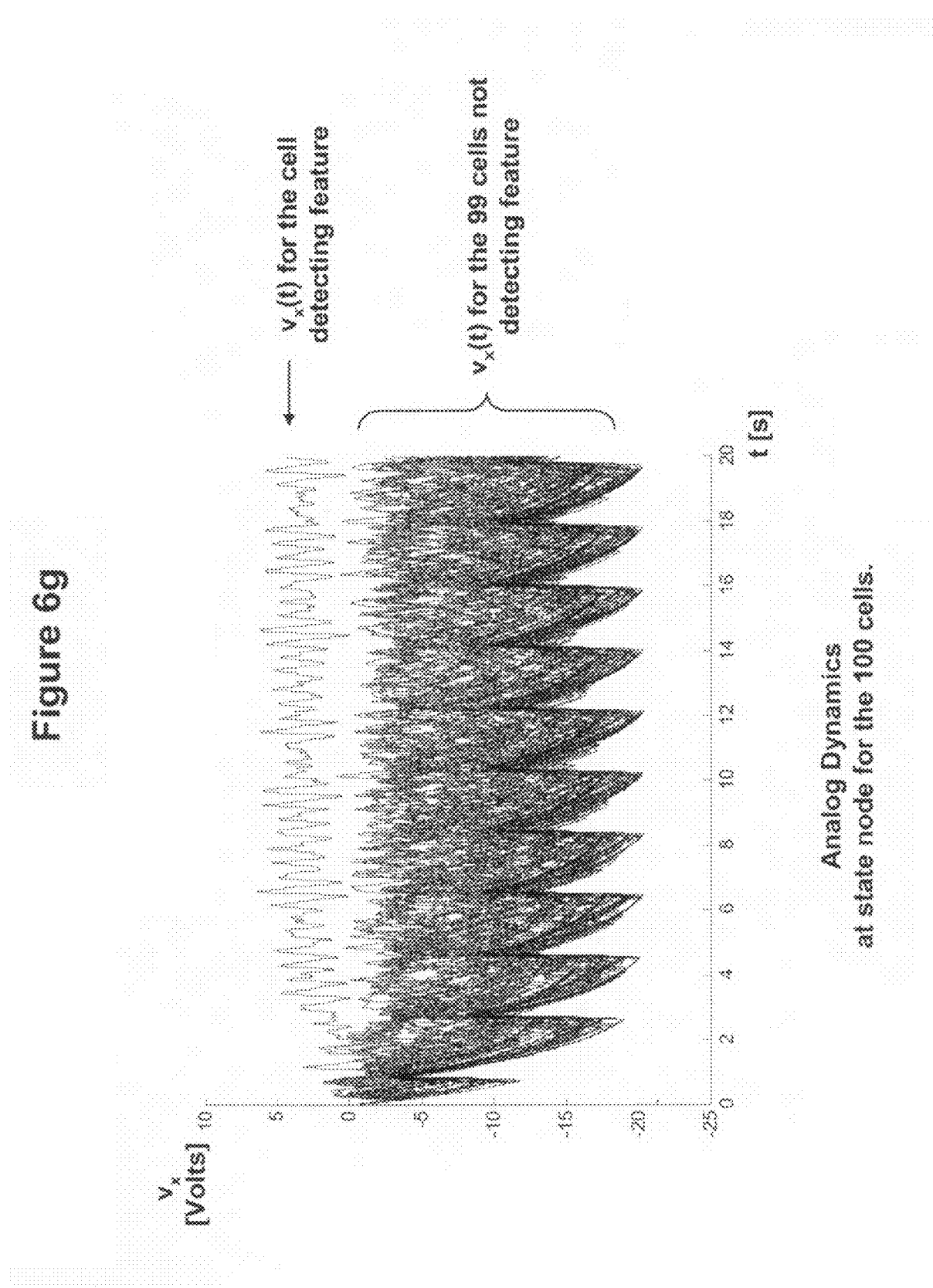

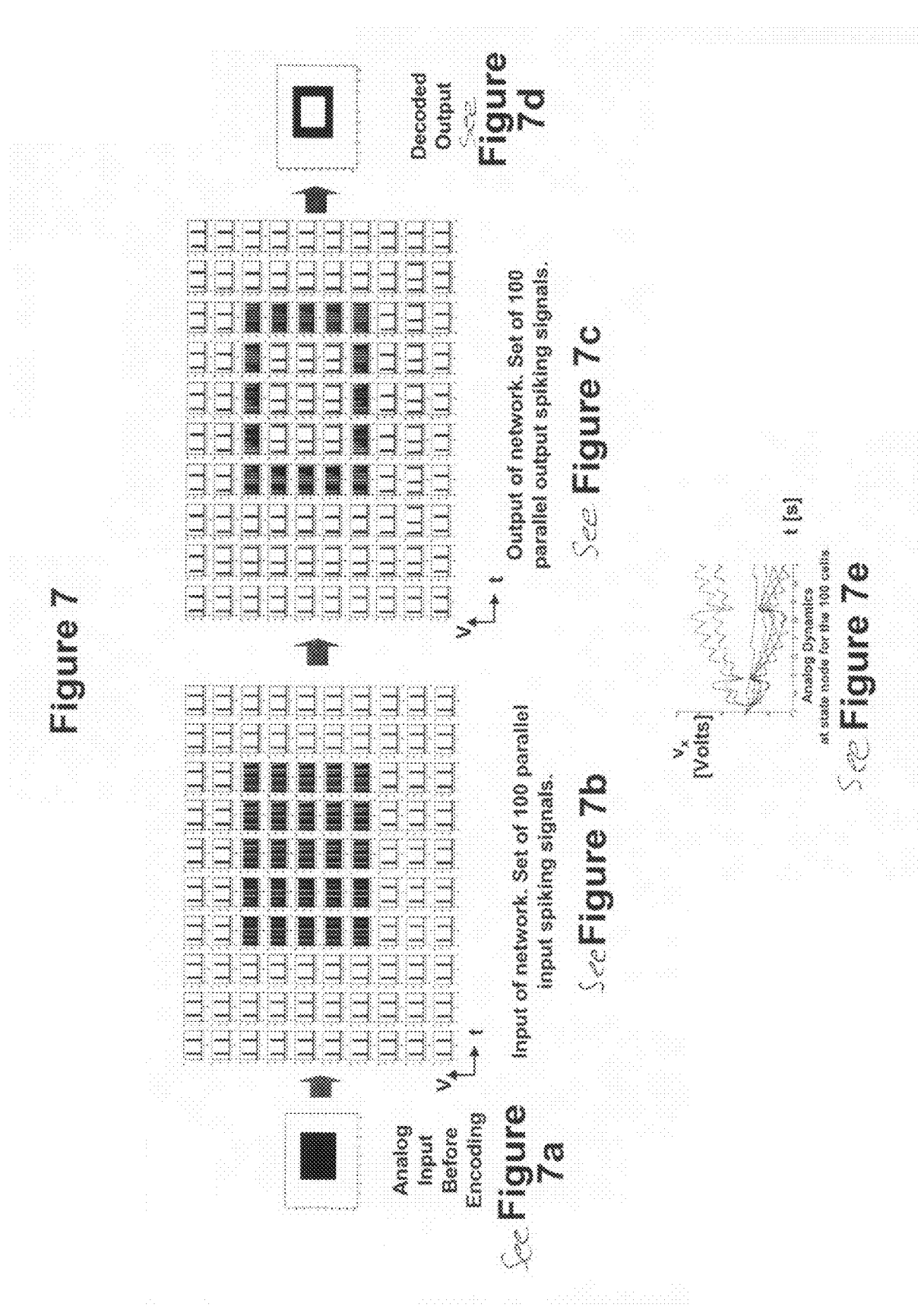

Output of network. Set of 100 parallel output spiking signals.

Voltage at state node, $v_x(t)$, for all 100 cells of the network during the detection of an edge (100 curves superimposed in a single plot)

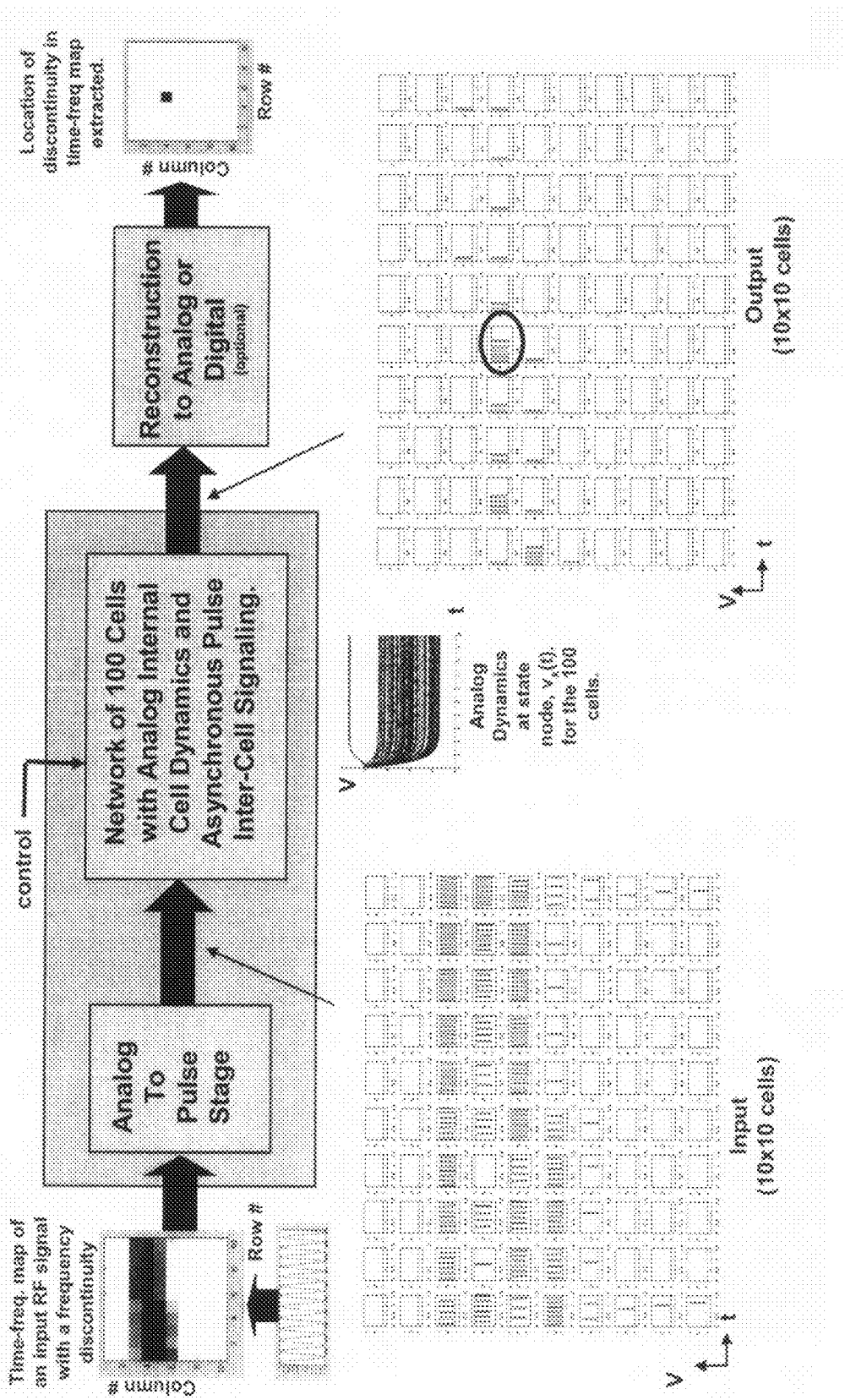

Input of network. Set of 100 parallel input pulse signals.

Output of network. Set of 100 parallel output pulse signals.

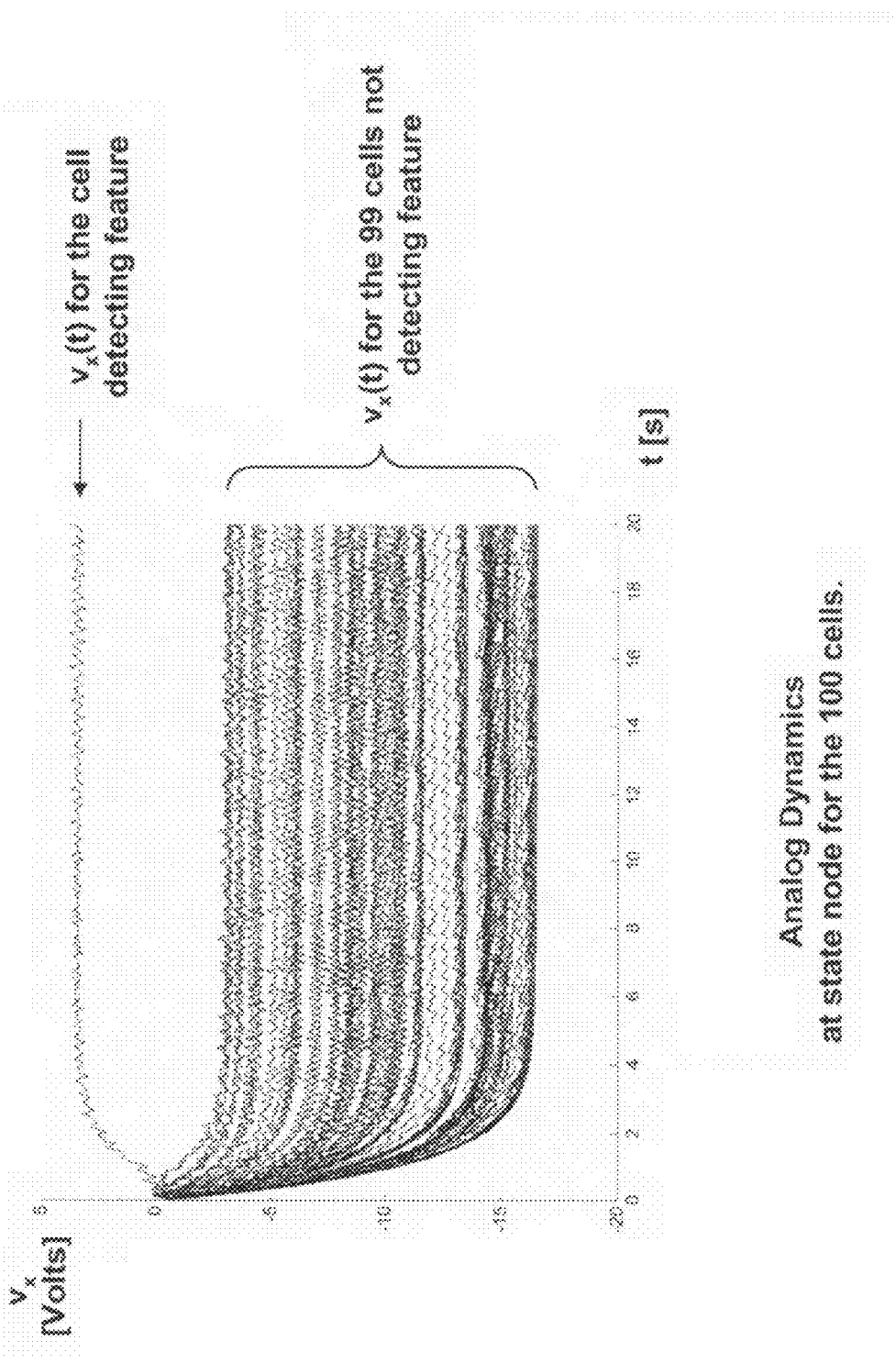

US 7,822,698 B1

SPIKE DOMAIN AND PULSE DOMAIN NON-LINEAR PROCESSORS

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This invention relates to a nonlinear network for signal processing. The network is composed of processing cells. The cells have analog dynamics. However all the interconnecting signals between cells are spiking signals of fixed height, in one embodiment, or pulse signals of fixed height in another embodiment. All the information on these signals is encoded in the timing of the spikes or pulses, as the case may be. The circuits of this invention do not require any analog feedback amplifiers. Simple 1 bit DACs (Digital to Analog Converters) are used in all the internal feedback loops. Their gain is used to adjust the operation of the network.

BACKGROUND

The disclosed circuits are suitable for compact implementation in VLSI technology. Each elementary circuit is composed of DACs, integrators, hysteresis quantizers, delay elements and simple asynchronous logical gates. All the circuit feedback signals and the circuit output signal encode analog information in the time domain via asynchronous spike signals with just two amplitude levels. The information in these signals is not quantized.

The present invention provides apparatuses and methods for solving systems of coupled first order non-linear differential equations in either the spike domain or the pulse domain without quantization noise. As such the disclosed apparatuses and methods allow for fast feature extraction tasks to occur in either the spike domain or pulse domain, again without quantization noise. The disclosed technology can be applied to real-time non-linear processing of input analog signals, such as signals from RF or hyperspectral sensors.

Previously these tasks could be solved in the (1) original analog domain via analog amplifiers or in the (2) digital domain after an ADC (Analog to Digital Converter) digitization. In the analog domain the disadvantage is that accuracy is severely limited by dynamic range of the analog components (feedback analog amplifiers). In the digital domain the disadvantages include the fact that speed is limited by the performance of ADC conversion and that frequently digital circuits include timing gates that regardless of their frequency have the effect of introducing quantization noise since the (i) the amplitude of digital signals is inherently quantized and the timing of transitions is quantized by the presence of timing gates.

The disclosed circuitry avoids: (1) the accuracy limitations of analog computing and (2) the speed limitation and quantization noise of traditional ADC conversion. The implementation of the suggested circuit is more compact than an equivalent analog circuit or a traditional digital circuit. The key circuit components are hysteresis quantizers, integrators, and simple (and intrinsically-linear) 1-bit digital to analog converters.

The prior art includes:

(1) A. Lazar and L Toth, "Perfect Recovery and Sensitivity Analysis of Time Encoded Bandlimited Signals," IEEE Trans. on Circuits and Systems-I, vol. 51, no. 10, pp. 2060-2073, October 2004. This document discloses a single time encoder circuit limit cycle oscillator. However, in this work the circuit has a single input and a single output. No computation is done beside the conversion from analog to pulse type.

(2) J. Cruz et al., "A 16×16 Cellular Neural Network Universal Chip," in Cellular Neural Networks and Analog VLSI, edited by L. Chua et al., Kluwer Academic Publishers, 1998. This document provides an example of an analog network to do classification tasks. The information is encoded in the amplitude of voltages or current signals. Accuracy is limited by the analog components, such as transconductance amplifiers.

(3) FIG. 1 is a diagram of a prior art time encoder. This circuit has a single analog input 2 and a single pulse output 4. This circuit encodes analog input signals into a pulse signals. If the analog signal is band limited the encoding can be without loss of information. That is, the input u(t) can be recovered from the timing of the output signal z(t). A time decoding machine of the type disclosed by Lazar and Toth (cited above) can be used to perfectly recover the analog input u(t) from the asynchronous pulse output z(t).

BRIEF SUMMARY OF THE INVENTION

The present invention provides a neural network comprising: an array of interconnected processors, each processor operating either the pulse domain or spike domain, and each said processor having:
  first inputs selectively coupled to other processors in said array of interconnected processors, each first input having an associated 1 bit DAC coupled to a summing node,
  second inputs selectively coupled to inputs of the neural network, the second inputs having current generators coupled to said summing node,
  a filter/integrator for generating an analog signal corresponding to current arriving at the summing node, and
  if the processors operate in the pulse domain, an analog-to-pulse converter for converting an analog signal derived either directly from the filter/integrator or via a non-linear element, to the pulse domain, and providing the converted analog signal as an unquantized pulse domain signal at an output of the processor;
  if the processors operate in the spike domain, an analog-to-spike converter for converting an analog signal derived either directly from the filter/integrator or via a non-linear element, to the spike domain, and providing the converted analog signal as an unquantized spike domain signal at an output of the processor;
  wherein the array of interconnected processors are selectively interconnected with either unquantized pulse domain or spike domain signals.

BRIEF DESCRIPTION OF THE DRAWINGS

FIG. 2*a* is a diagram of a possible architecture circuit of this invention showing a plurality of processing cells and possible feedback and inter-cell communication paths.

FIG. 2*b* is a graph showing the spiking-type inter-cell signals and output signals which occur in a spiking-type signal embodiment of FIG. 2*a*.

FIG. 2c is a graph showing the pulse-type inter-cell signals and output signals which occur in a pulse-type signal embodiment of FIG. 2a.

FIGS. 5a-5b depict a second embodiment of a processing cell which is based on using pulse-type signals.

FIG. 6 shows a simulation example in which the disclosed network is used to extract specific features from a 2-D map. This figure also shows the relationships of FIGS. 6a-6f to this simulation example, which operates in the spike domain.

FIGS. 6a-1 and 6a-2 shows details of the Analog to Spike and Reconstruction to Analog or Digital Stages, respectively, shown in FIG. 6a.

FIG. 6f shows the final map at the output of the recovery block in the simulation.

FIG. 6g shows in a single plot the $v_x(t)$ for all the processing cells for the first twenty seconds.

FIG. 7 shows a setup for a second example of a simulation of the spike-domain processor. This figure also shows the relationships of FIGS. 7a-7e to this simulation example.

FIG. 8 shows a simulation example in which the disclosed neural network is used to extract specific features from a 2-D map. This figure also shows the relationships of FIGS. 8a-8g to this simulation example, which operates in the pulse domain.

FIG. 8g shows in a single plot the $v_x(t)$ for all the processing cells for the first twenty seconds.

DETAIL DESCRIPTION OF A PREFERRED EMBODIMENT

Figure 1:
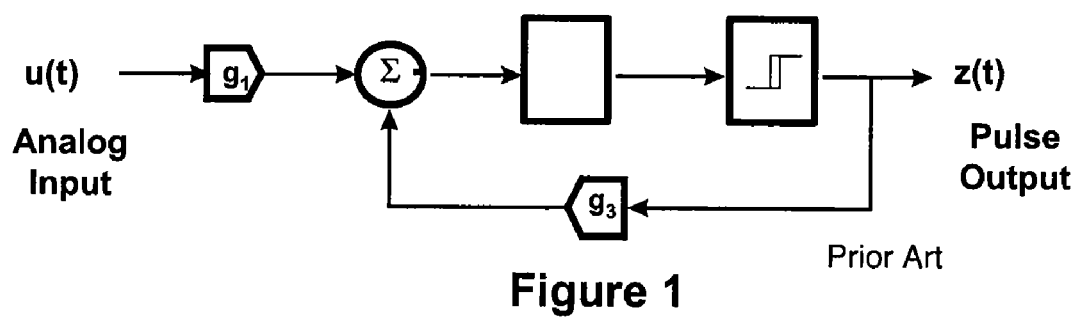
FIG. 1 is a diagram of a prior art time encoder.

FIG. 2a is a diagram of the overall architecture of a type of neural computer. It is comprised of many cells 10 and can be said to comprise a recurrent network 100 of processing cells 10. Each cell 10 can receive external inputs. The external inputs 11 can be either analog or time encoded. As will be seen, time encoded inputs are preferred. Each cell 10 can also receive recurrent inputs from other cells 10 and from itself (self-feedback) via signal paths 12. All the inter-cell signals (on paths 12) and output signals (at outputs 13) are time encoded as spikes, in one embodiment, or as pulses, in a second embodiment. FIG. 2a depicts only five cells 10. However, it is to be understood that practical designs may typically include hundreds or thousands or even more cells 10. The number of cells 10 is a matter choice and their number as well as the number, pattern and signal weighting of the inter-cell signal paths 12 may well reflect the complexity of equations being solved by the network of FIG. 2a. The neural computer of FIG. 2a can be made using traditional semiconductor manufacturing technologies by forming the circuits of the cells 10 and the inter-cell signal paths 12 on an integrated circuit chip. The signal paths 12 of the neural computer may be pre-programmed into the neural computer at the time it is designed so that they assume a predetermined pattern for solving a predetermined problem or they may be programmable in the sense that the neural computer may be programmed to perform different tasks by changing the pattern of the signal paths (and their signals weights or gains) from time to time.

FIG. 2b shows a typical spiking signal. All the information is encoded by the timing of the spikes ($t_1, t_2, t_3, \ldots$). These timing values are preferably not quantized time-wise. The amplitude of inter-cell spiking signals is quantized and is regenerated at a receiving cell. The encoded spiking signal is not subject to distortion due to signal amplitude attenuation during transmission from one cell 10 to another cell 10. The spike encoding can be used without quantization or information loss. Instead of spike encoding, pulse encoding may be used instead. FIG. 2c shows a typical pulse encoded signal. As in the case of the spiking signal of FIG. 2b, timing values of the pulse encoded signals are also preferably not quantized time-wise. The amplitude of inter-cell pulse signals is quantized and is regenerated at a receiving cell. The encoded pulse signal is not subject to distortion due to signal amplitude attenuation during transmission from one cell 10 to another cell 10. This encoding is done without quantization or information loss.

Each cell 10 typically receives multiple input signals 11, 12 and produces a single output signal, but the output of a single cell 10 can be fanned out to multiple inputs of other cells 10, for example, and if needed, by buffering the cell output signals via a pair of inverters (not shown), for example.

Figures 3A, 3B, 3C:
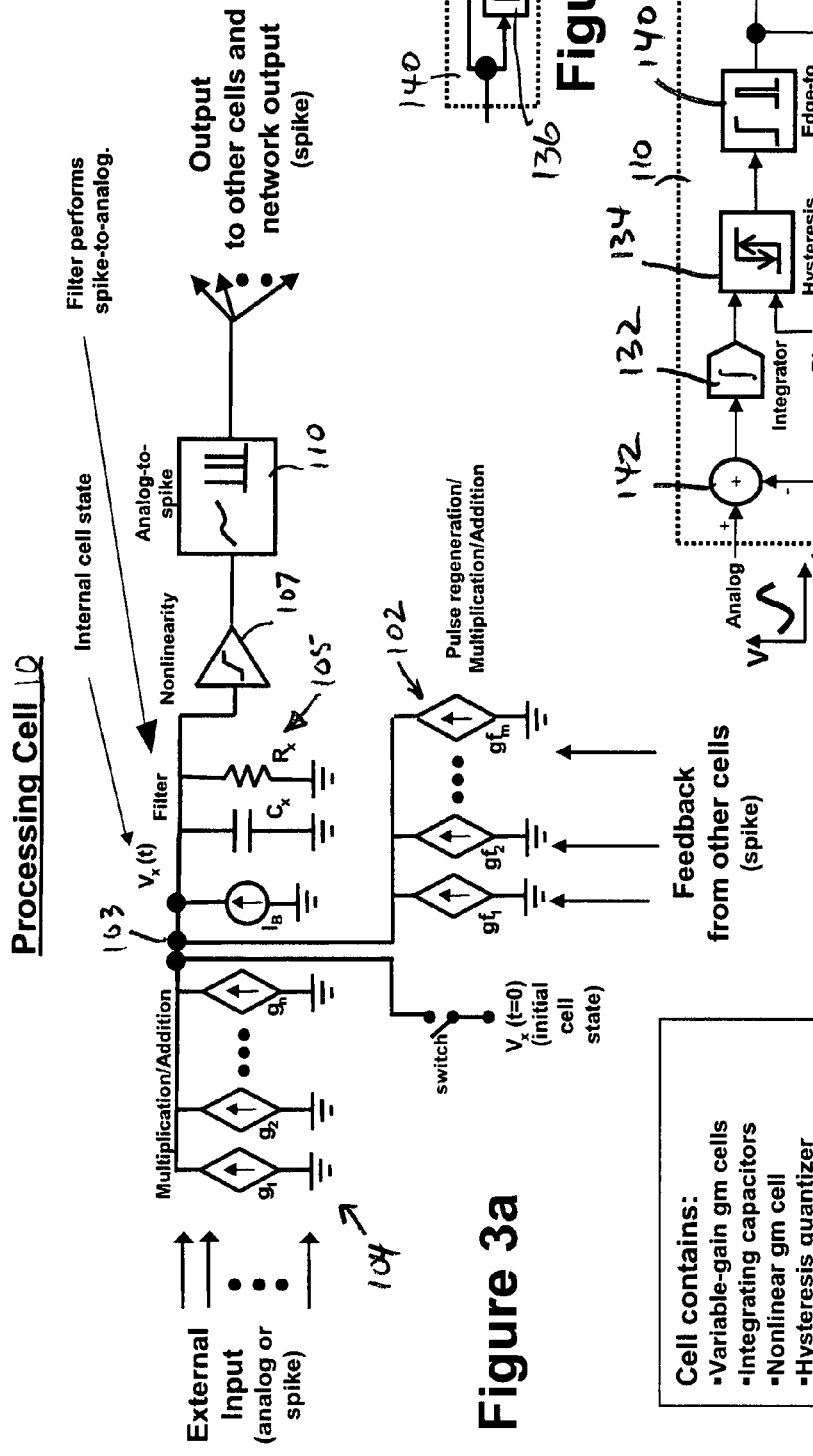
FIGS. 3a-3c depict a first embodiment of a processing cell which is based on using spiking-type signals.

FIGS. 3a-3c depict a first embodiment of a cell 10. This embodiment is based on using spiking signals. A rather similar embodiment using pulse signals will be discussed briefly with respect to FIGS. 5a and 5b, which parrot FIGS. 3a-3c function-wise, but operate in the pulse domain rather then the spike domain.

As can be seen in FIG. 3a, each cell 10 is preferably composed of two front-end arrays of simple asynchronous 1-bit DACs (Digital to Analog Converters) 102 and 104. In many embodiments, these two arrays may well be thought of as a single array, since the 1-bit DACs in arrays 102, 104 are preferably identical to each other. The 1-bit DACs are depicted with gains $g_1, g_2, \ldots, g_n$ for array 104 and $gf_1, gf_2, \ldots, gf_m$ for array 102. The subscripts n, m can logically be as large as the number of cells 10 in the neural network so that if the neural network has one hundred cells, then each cell 10 might have up to ninty-nine feedback inputs from other cells and perhaps self feedback also, bringing the total to one hundred. Similarly, the number of external inputs can be rather large depending on the nature and complexity of the problem being addressed by the neural network.

However, if the cell 10 is intended to receive analog inputs directly (something which the present inventors believe not to be desirable for reasons to be discussed), then array 104 would comprise, instead, an array of voltage controlled current sources. If the array 104 needs one hundred inputs, then it is considerably easier to implement the one hundred inputs with one hundred DACs (for each cell 10) than with one hundred voltage controlled current sources, which those skilled in the art will appreciate occupy much more space (on a chip) than do one hundred 1-bit DACs. So spiking signals are preferred to analog values at the input of the neural network of FIG. 2a. If analog values need processing, which is often the case, it is preferable to convert the analog values to be processed to the spike domain before handing off the signals to the neural network of FIG. 2a so as to avoid having very large numbers of voltage controlled current sources in arrays 104 for large numbers of cells 10. Converting the the aforementioned analog values to be processed to the spike domain before handing off the signals to the neural network of FIG. 2a still requires numbers of voltage controlled current sources, but the number needed is usually much less than if the conversion from analog to spike domain is accomplished in array 104 of cells 10. In the preferred case the spike conversion for a given input is only made once, regardless of how many multiple cells receive that given input.

The outputs of the arrays 102 and 104 of 1-bit DACs are coupled together in a current-summing fashion at a node 103 and converted to an analog voltage $V_x(t)$ by means of an internal analog filter 105. This filter is usually a low pass filter. It can be a first order (or higher order) low pass filter. If it is a first order low pass filter it can be simply implemented as a capacitor in parallel with a resistor. A saturation-type nonlinearity 107 is preferably used after the filter 105. This type of nonlinearity allows many additional image processing tasks to be performed than if it were eliminated, and given the fact that it is easily implemented, it is preferably included. While in some embodiments it can be eliminated, it is preferably embodied using a saturation-type differential amplifier. At its output is an output spike time encoder 110, which is shown in greater detail in FIGS. 3b and 3c. The spike time encoder 110 is used to convert the analog values from nonlinearity 107 back into the spike domain.

Turning to FIG. 3b, the spike time encoder 110 is preferably comprised of an integrator 132, an asynchronous hysteresis quantizer 134, and edge-to-spike converter 140, which converter 140 preferably comprises a delay element 136 (see FIG. 3c), and a two-input asynchronous logic gate 138 (see also FIG. 3c). This gate is an asynchronous AND gate, one of whose inputs in inverted. An output of the edge-to-spike converter 140 is fed back to the encoder's input via a summing node 142.

The processing task to be performed by the neural network with the first order filter may well comprises solving systems of first order non-linear differential equations is set by the gains of the various 1-bit DACs in arrays 102 and 104 at the input of each cell 10. These 1-bit DACs can be very compact when implemented in VLSI. They are inherently linear, as both their inputs and outputs are binary valued. The design of 1-bit DACs is well known in the art and therefor their design and operation will not be further discussed herein.

Figure 4:
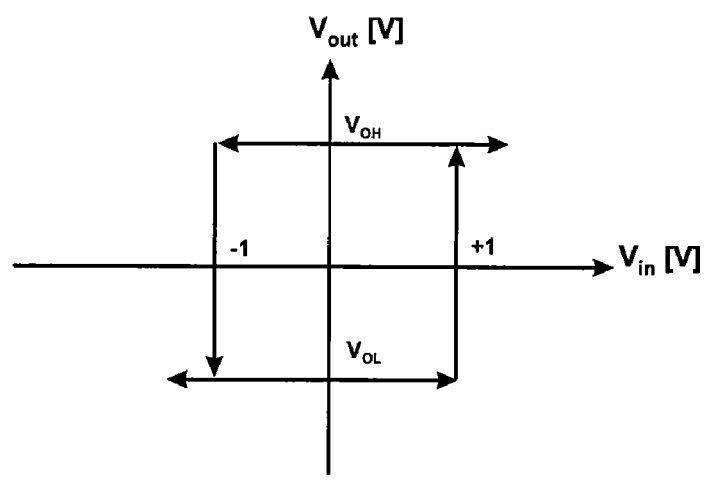
FIG. 4 shows a graph of the output-input characteristic of a hysteresis quantizer shown in FIGS. 3b and 5b.

FIG. 4 shows a graph of the Output-Input characteristic of the hysteresis quantizer 134. There are only two possible output levels, $V_{OL}$ and $V_{OH}$ (which happen to be $-1V$ and $+1V$ in this embodiment.). They are shown in the vertical axis of this graph. The transition between the two output levels occurs at two different input trigger voltage levels. In this exemplary embodiment these trigger voltage levels are normalized to $-1V$ and $+1V$. They are shown on the horizontal axis of the graph. All these values can be scaled, as best suited for a particular VLSI implementation, without changing the basic operation of the circuit.

FIGS. 5a and 5b rather closely parrot FIGS. 3a-3b function-wise, but depict a cell 10 for a neural network operating in the pulse domain rather than the spike domain. The output spike encoder 110 is replaced with an output pulse encoder 110', which as can be seen from FIG. 5b, is similar to the output spike encoder 110 of FIGS. 3b and 3c, except that no edge-to-spike converter 140 is needed.

FIG. 6 shows a simulation example based on spiking signals. In this example the network is used to extract specific features from a 2-D map. In this exemplary embodiment the neural network contains a hundred cells 10.

Figure 6A:
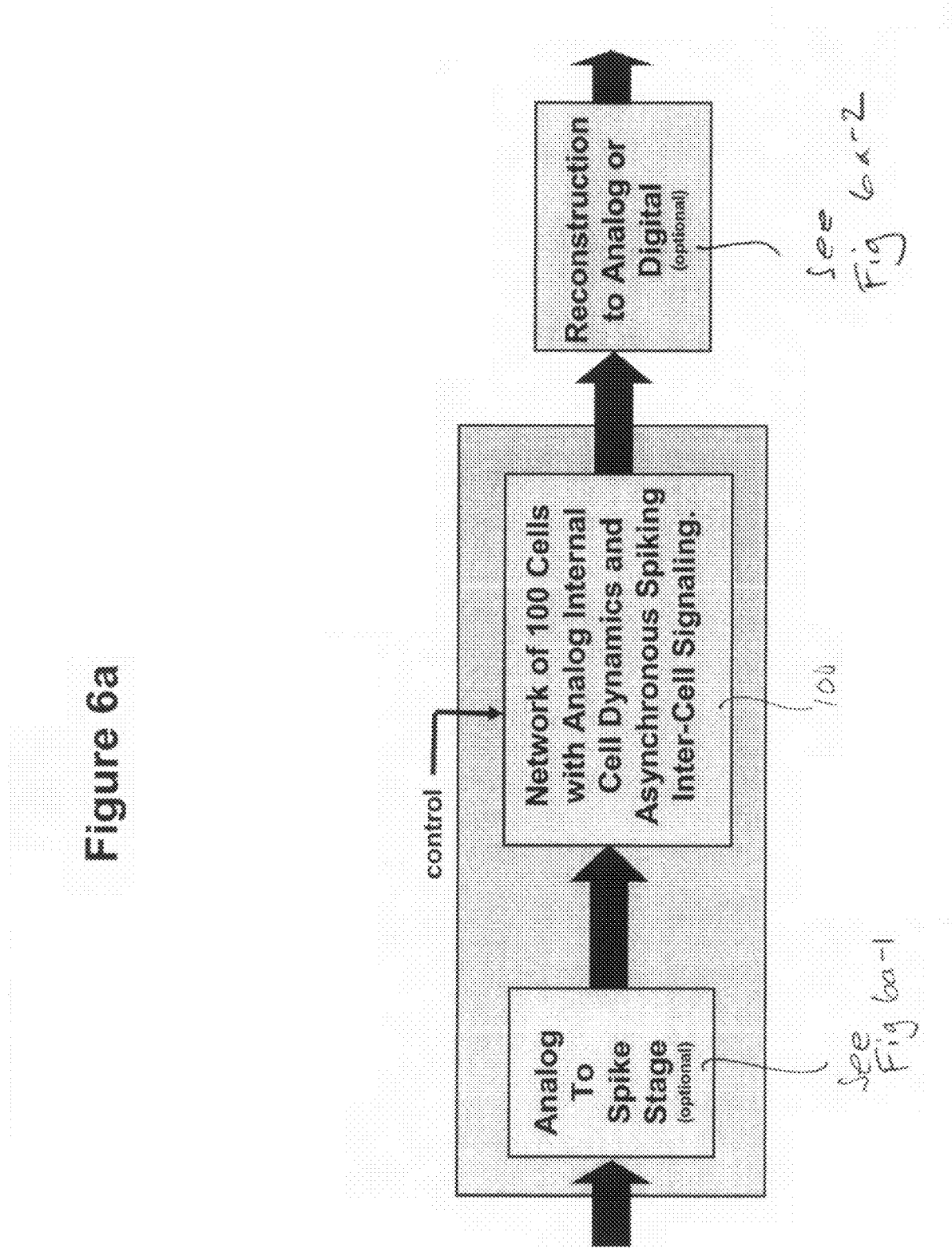
FIG. 6a shows a diagram of the setup for the simulation discussed with reference to FIGS. 6 and 6b-6f.
Figures 1, 6A:
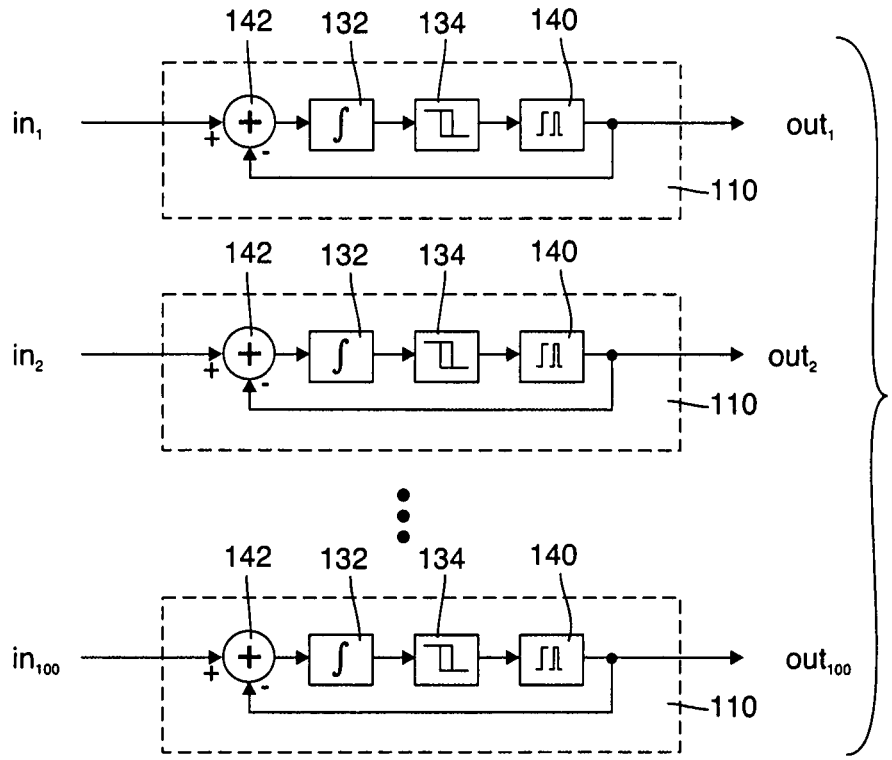
Figures 2, 6A:
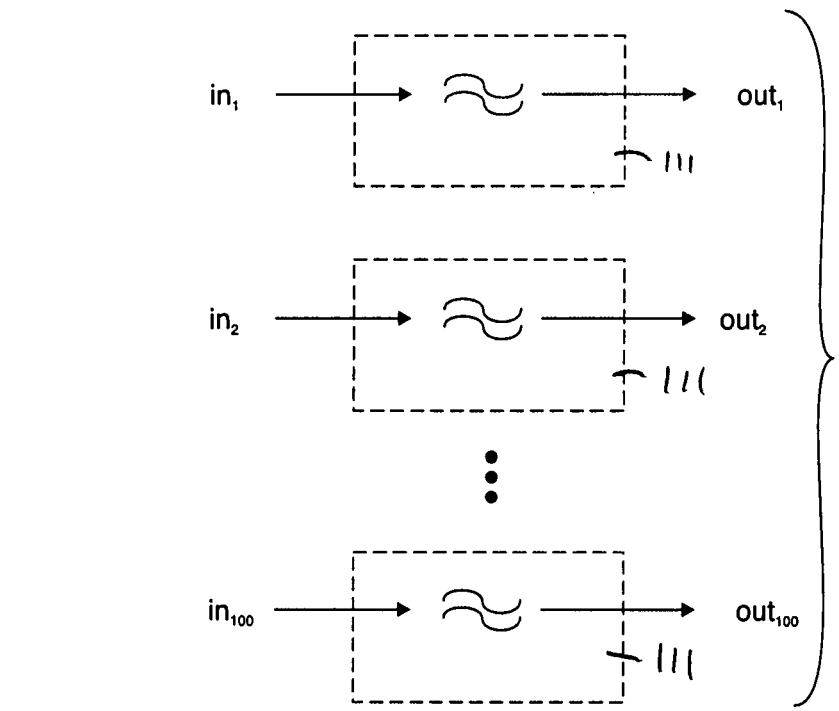

FIG. 6a shows a diagram of the setup for the simulation. It is composed of: (1) an optional analog to spike stage, (2) the main spiking processing network with, in this embodiment, one hundred cells 10, and (3) an optional reconstruction block. FIG. 6a-1 shows possible implementation of the Analog to Spike Stage shown in FIG. 6a while FIG. 6a-2 shows possible implementation of the Reconstruction to Analog or Digital Stage shown in FIG. 6a. FIG. 6a-1 depicts an array of elements 110 which preferably have the same construction as the spike time encoder 110 previously described with reference to FIGS. 3b and 3c. As such elements 110 shown in FIG. 6a-1 do not require further elaboration.

The analog to spike stage is used to convert original analog signal into spike signals. It is composed of an array of one hundred units or simplified cells 110 for this simulation. The internal circuitry of each unit is preferably the same as that shown in the block 110 of FIG. 3a. Each unit has a single external analog input and a single external spike output. There is internal feedback inside each unit. This stage is not needed if the original signals already exist in a spiking signal format.

The main processing network 100, in the simulation embodiment, was composed of a hundred processing cells 10. In the most general case each processing cell 10 can have a total of external inputs equal to the number of cells in the embodiment and a total of feedback inputs equal to the number of cells in the embodiment. Since the simulation was based on a hundred cells, then each processing cell 10 can have a hundred external inputs and a hundred feedback inputs. The external inputs are connected to the input terminals of 1-bit DACs of array 104 (see also FIG. 3a—which means that there are up to a hundred DACs in this simulation embodiment) and the feedback inputs connected to the input terminals of the 1-bit DACs (again with up to a hundred DACs) of array 102. The weights or gains of 1-bit DACs are set by an external control vector. In most applications all the processing cells 10 can share the same weight vector, as is in the case of cellular neural networks. This simplifies the control mechanisms, as all cells share the same control signals. This also reduces the amount of wiring of the circuit in a VLSI implementation. Moreover, in most cases the weight vector is very sparse, with most weights equal to zero. Only the 1-bit DACs associated with significant non-zero values really need to be implemented if one desires to simplify the design. In a first processing example only five 1-bit DACs with non-zero weights are needed in the array 104 of each cell 10 and only one 1-bit DAC with a significant non-zero weight is needed in the array 102 of each cell 10. Thus in this first example each cell requires a minimum of six 1-bit DACs with significant non-zero weights. However, in the most general case where the significance (or lack thereof) of the weights is not known in advance, then a full array of 1-bit DACs may well be needed for both arrays 102 and 104.

The reconstruction block is used to convert the output spiking signals (one for each of the hundred processing cells 10) into an analog or digital value. FIG. 6a-2 depicts an array of one hundred low pass filters 111, which preferably each have a cut off frequency that is below a frequency corresponding to the average spike rate. These filters 111 could each be implemented is a simple first order filter having a resistor and a capacitor (not shown) coupled together, in parallel, between the inputs ($in_1$ . . . $in_{100}$) and ac ground. Alternatively, the filters 111 could be implemented by a digital signal processor (DSP) programmed for low pass filter as described above.

Each filter 111 may also have a threshold circuit. The analog circuit converts the spiking signal to an analog. The threshold circuit provides a +1 output when the analog signal is positive and a −1 when the analog signal is negative, should a binary output be desired. The reconstruction block is optional in that it is needed if the spiking domain signals need to be converted to the analog or digital domains.

FIGS. 6b to 6f show a first example of a simulated operation of the spike-domain processor. In this first example the processor is used to detect a specific feature in a two dimensional map shown in FIG. 6c.

Figures 6B, 6C:
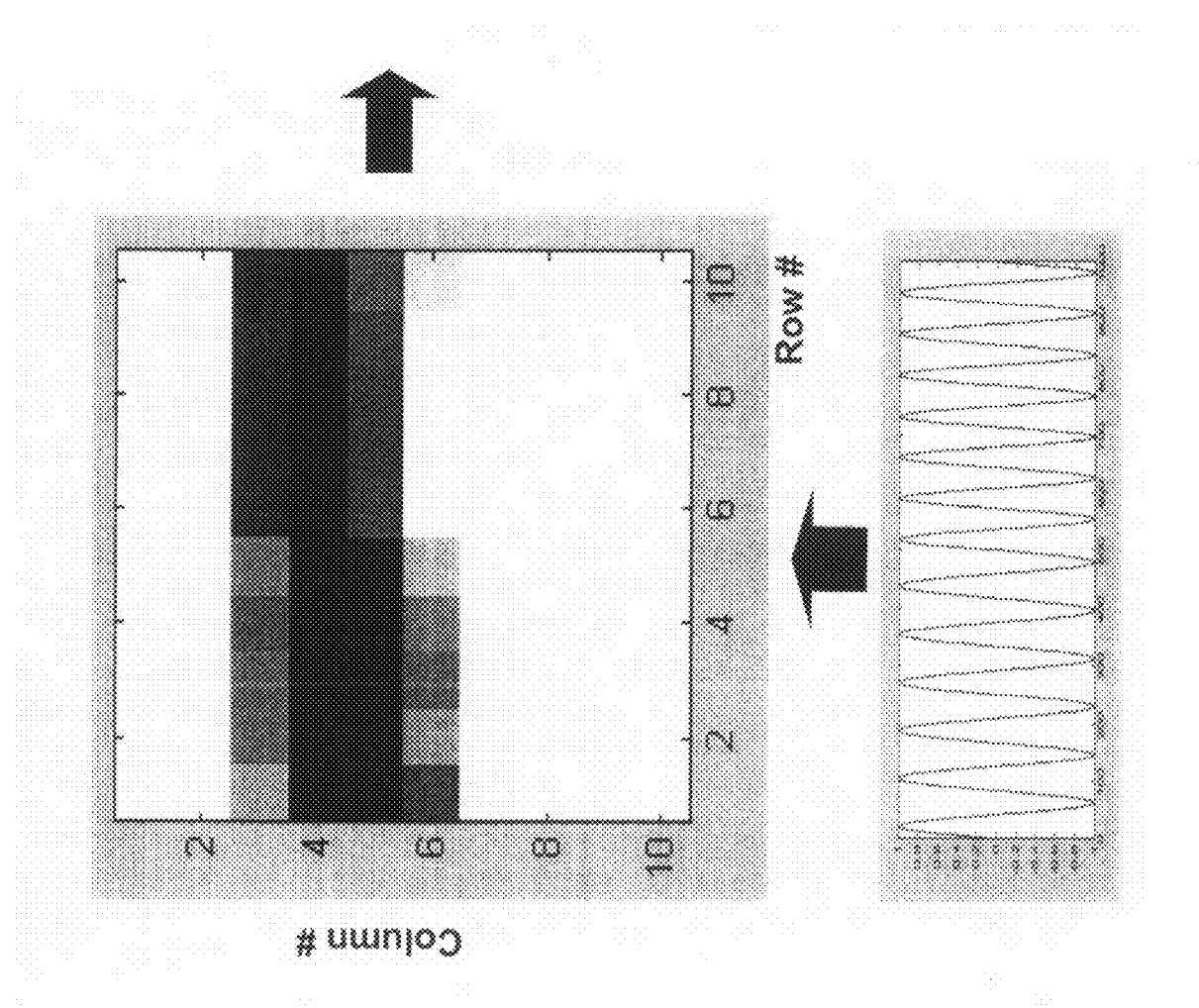
FIG. 6b shows an example of a signal with a frequency discontinuity.
FIG. 6c shows a two-dimensional map (a wavelet map) associated with signal 6b.

FIG. 6b shows an example of a signal with a frequency discontinuity. FIG. 6c shows a two-dimensional map (a wavelet map) associated with signal 6b. The disclosed network is used in this example to extract features from this two-dimensional map. The two dimensional map is composed of a 10×10 element grid in the simulated embodiment. An analog value between −1 and +1 is associated with each of the one hundred elements of the grid in this embodiment. The value of +1 is shown in black, the value of −1 is shown in white, and values in between are shown in different shades of gray. In this particular example the darkest areas of the map are concentrated in a blurred region that is almost horizontal, but with a small diagonal (in a lower-left to upper-right direction) feature. The disclosed network is used to determine the grid location of this feature in the map.

Figure 6D:
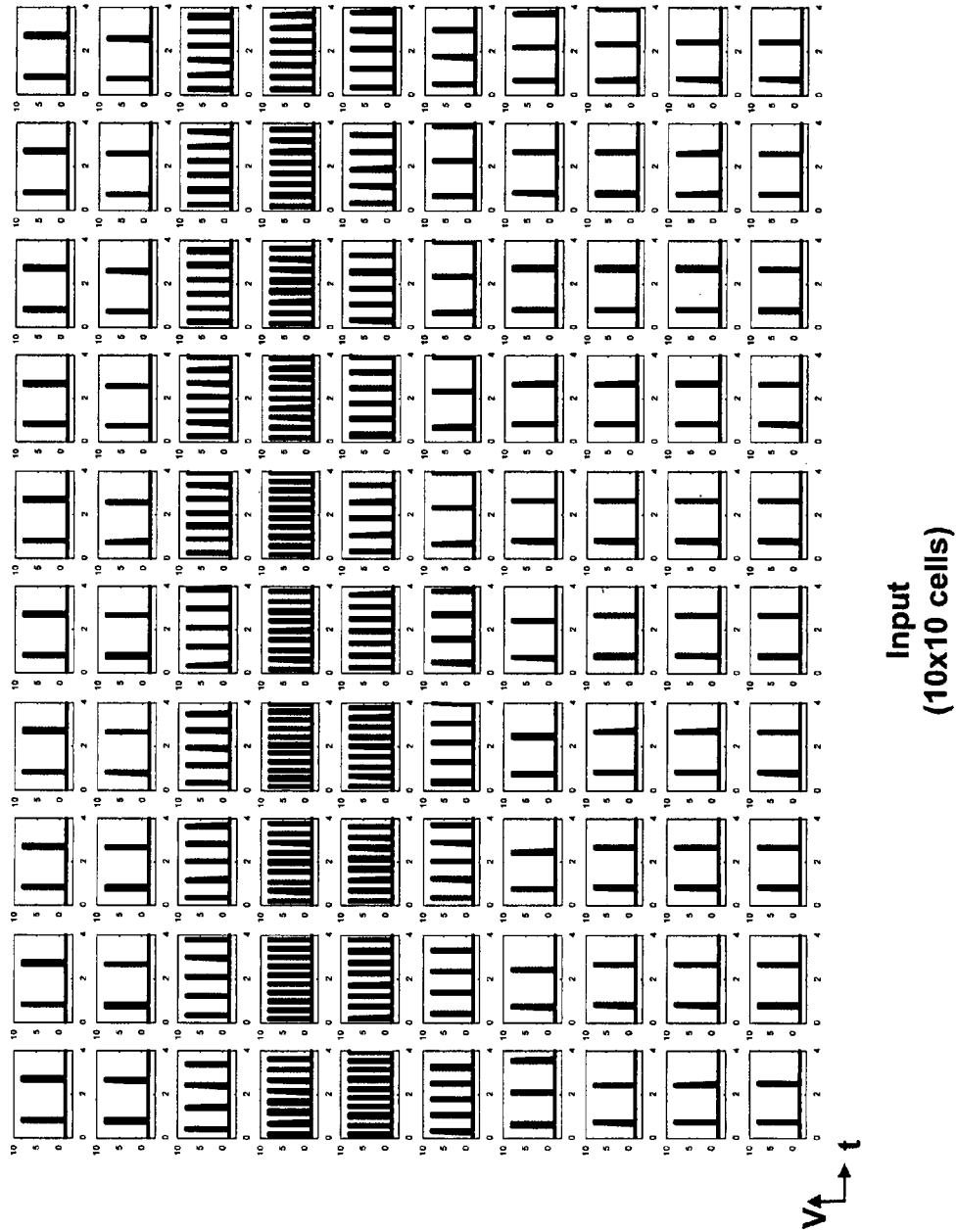
FIG. 6d shows a hundred spiking signals generated by the Analog-to-Spike stage when the analog map of FIG. 6c is used as a steady state input.

FIG. 6d shows a hundred spiking signals generated by the Analog-to-Spike stage when the analog map of FIG. 6c is used as a steady state input. In FIG. 6d the one hundred signals are arranged into a 10×10 grid of plots. Each plot contains the spiking signal encoding the corresponding analog value of FIG. 6c during the first four seconds (using normalized units for the resistor and capacitor circuit elements of FIG. 3a) for this simulation. It can be observed that the dark areas of the analog map of FIG. 6c are mapped into spiking signals with shorter intervals between spikes. The signals of FIG. 6d are used as external inputs for the neural network.

The network weights are set by the control bus that sets the 1-bit DAC weights. In this particular example only six 1-bit DACs of each cell have non-zero gain values for the reasons previously stated. Furthermore, in this example these six values are identical for all one hundred cells.

In this example five 1-bit DACs has non-zero weights in the array 104 of each cell 10. These five weights are:

For the 1-bit DAC connected to the spiking input (from FIG. 6d) located in the same pixel location (same row/column address) than the cell itself. The weight is: 3.

For the 1-bit DAC connected to a spiking input (from FIG. 6d) located one pixel the right of the cell itself. The weight is: 1

For the 1-bit DAC connected to a spiking input (from FIG. 6d) located one pixel the left of the cell itself. The weight is: 1

For the 1-bit DAC connected to a spiking input (from FIG. 6d) located one pixel the upper-right of the cell itself. The weight is: 2

For the 1-bit DAC connected to a spiking input (from FIG. 6d) located one pixel the lower-left of the cell itself. The weight is: 2

In this simulation one 1-bit DAC has non-zero weight in the array 102 of each cell 10. This weight is:

For the 1-bit DAC connected its own spiking output (self-feedback). The weight is: 3.

In addition the value $I_B$ of constant current source in the embodiment FIG. 3a is set to a value of −4.5 for all cells in this simulation. This analog current source can also be replaced in an alternative embodiment by a 1-bit DAC driven by analog to spike encoder identical as the one shown in FIG. 3b. In this later case the analog input of the analog-to-spike encoder is always a constant value and the weight of the new 1-bit DAC is controlled externally.

Figure 6E:
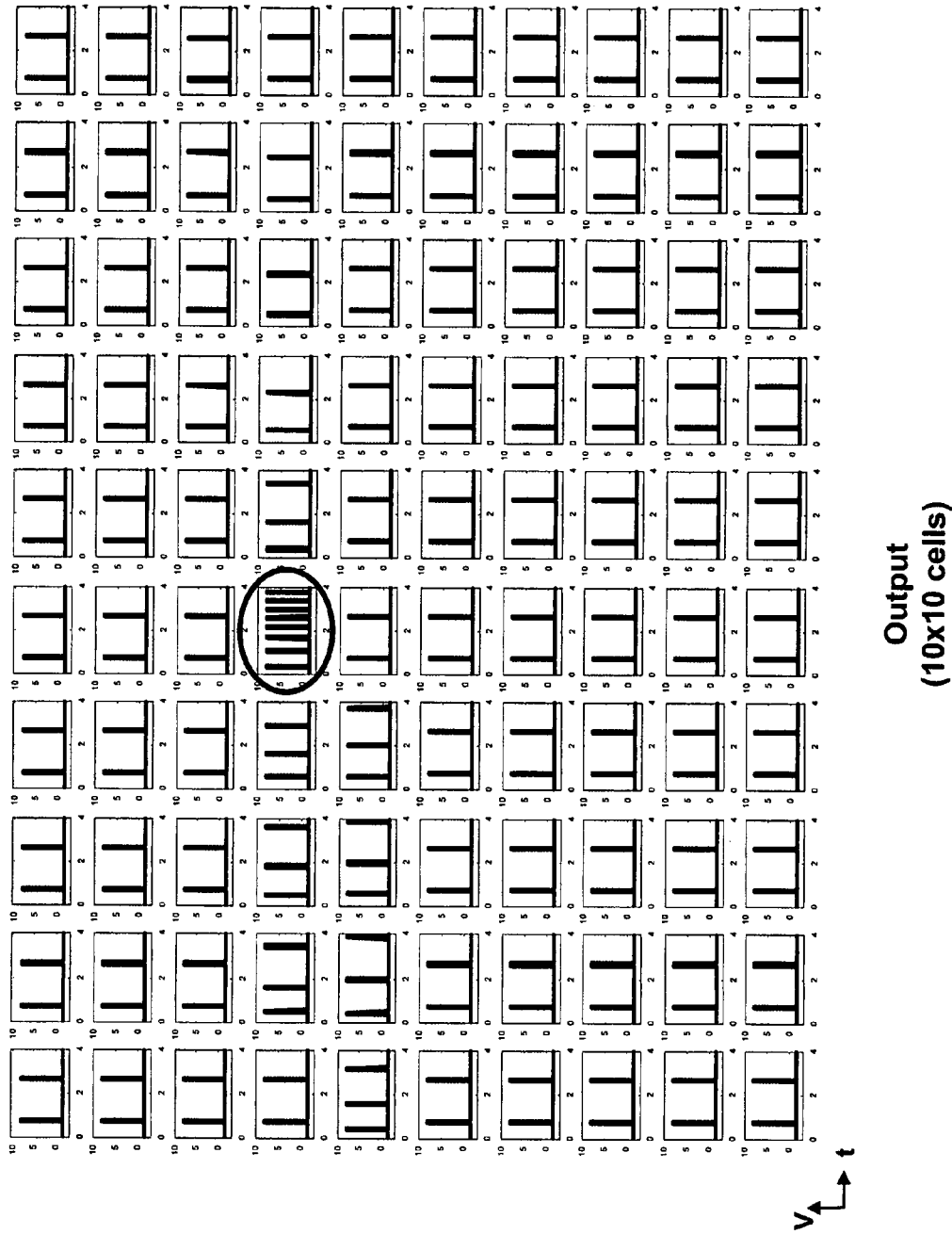
FIG. 6e shows the shows one hundred output spiking signals generated by the neural network.

FIG. 6e shows the shows one hundred output spiking signals generated by the neural network. The one hundred signals are arranged into a 10×10 grid of plots. Each plot contains the output spiking signals during the first 2 seconds of a simulation. It can be observed that only one of the signals converge into a high spiking rate. This signal is produced by the cell detecting the desired feature in the 2-dimensional input map.

FIG. 6f shows the final map at the output of the recovery block. This block uses as input the one hundred spiking signals of FIG. 6e. Only one of a hundred positions of the output map is black (value=+1). It represents the location of the desired feature.

All the signals between processing cells 10 in the main network 100 of cells are spiking signals. The only analog signals are the internal state voltages $v_x$. FIG. 6g shows in a single plot the $v_x(t)$ for all the one hundred cells for the first 20 seconds. Only one $v_x(t)$ curve converges to a positive value. That curve is associated with the cell detecting the desired feature. The convergence of a $v_x(t)$ to a positive or a negative value happens approximately in the first 4 seconds (using normalized units for the resistor and capacitor elements of FIG. 3.)

FIGS. 7 and 7a to 7e show a second example of a simulation of the spike-domain processor. In this second example the spike-domain neural processor is used to detect the location of the edges of an object in a two dimensional input map. This simulation is again based on an embodiment of neural network with one hundred processing cells 10.

Figure 7A:
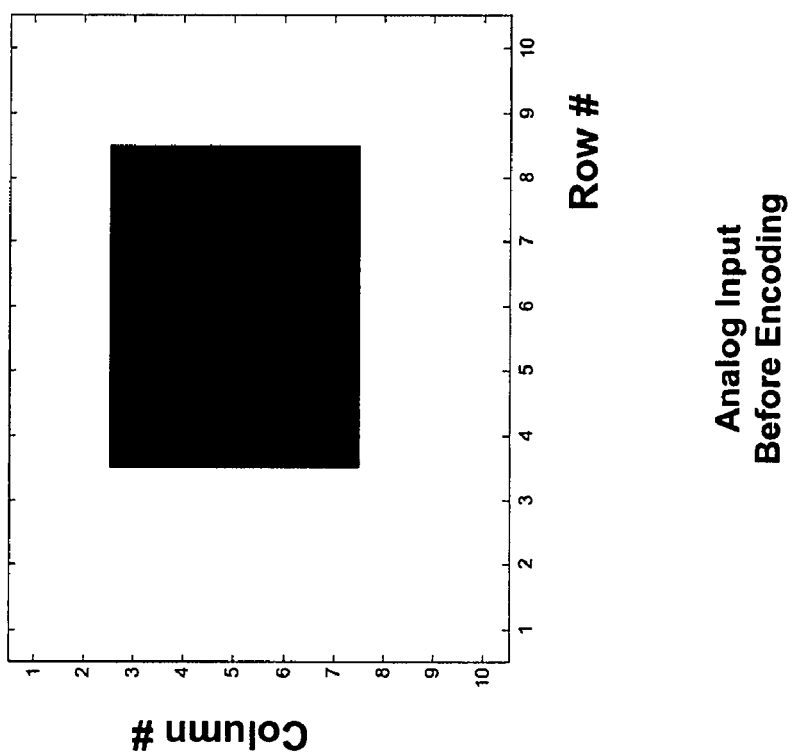
FIG. 7a shows a two-dimensional input map with a black object.

FIG. 7a shows a two-dimensional input map with a black object.

Figure 7B:
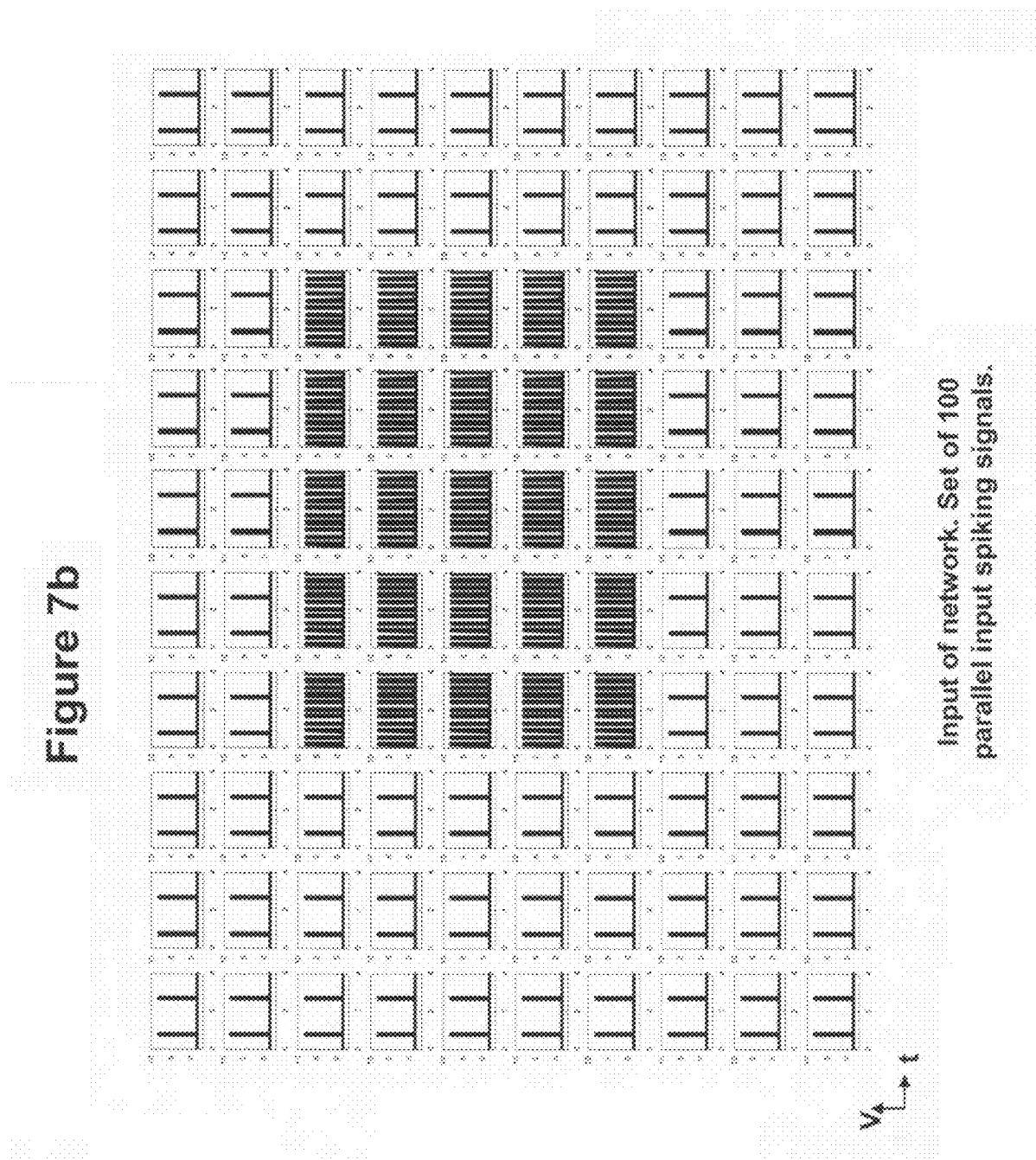
FIG. 7b shows one hundred spiking signals generated by the Analog-to-Spike stage when the analog map of FIG. 7a is used as a steady constant input.

FIG. 7b shows one hundred spiking signals generated by the Analog-to-Spike stage when the analog map of FIG. 7a is used as a steady constant input. Each subplot contains the spiking signal encoding the corresponding analog value of FIG. 7a during the first 4 seconds of a simulation. The signals of FIG. 7b are used as external inputs for the network.

The network weights are set by the control bus that sets the 1-bit DAC weights. In this particular example ten 1-bit DACs of each cell have non-zero gain values. Furthermore, in this example these ten values are identical for all one hundred processing cells 10.

In this example the nine 1-bit DACs have non-zero weights in the array 104 of each processing cell 10. These 9 weights are:

For the 1-bit DAC connected to the spiking input (from FIG. 6d) located in the same pixel location (same row/column address) than the cell itself. The weight is: 8.

For the 8 1-bit DACs connected to a spiking input (from FIG. 6d) located one pixel away (in any vertical, horizontal or diagonal direction) from the cell itself. The weight is: −1

In this example one 1-bit DAC has non-zero weight in the array 102 of each processing cell 10. This weight is:

For the 1-bit DAC connected its own spiking output (self-feedback). The weight is: 1.

In this edge detection processing example the ten weights are the same that have been used to set the gain of analog amplifiers in analog cellular neural networks for edge detection. But now the weights are used to change the gain of simple 1-bit DACs.

The value $I_B$ of the constant current source in the embodiment FIG. 3b is set to a value of −1 for all cells.

Figure 7C:
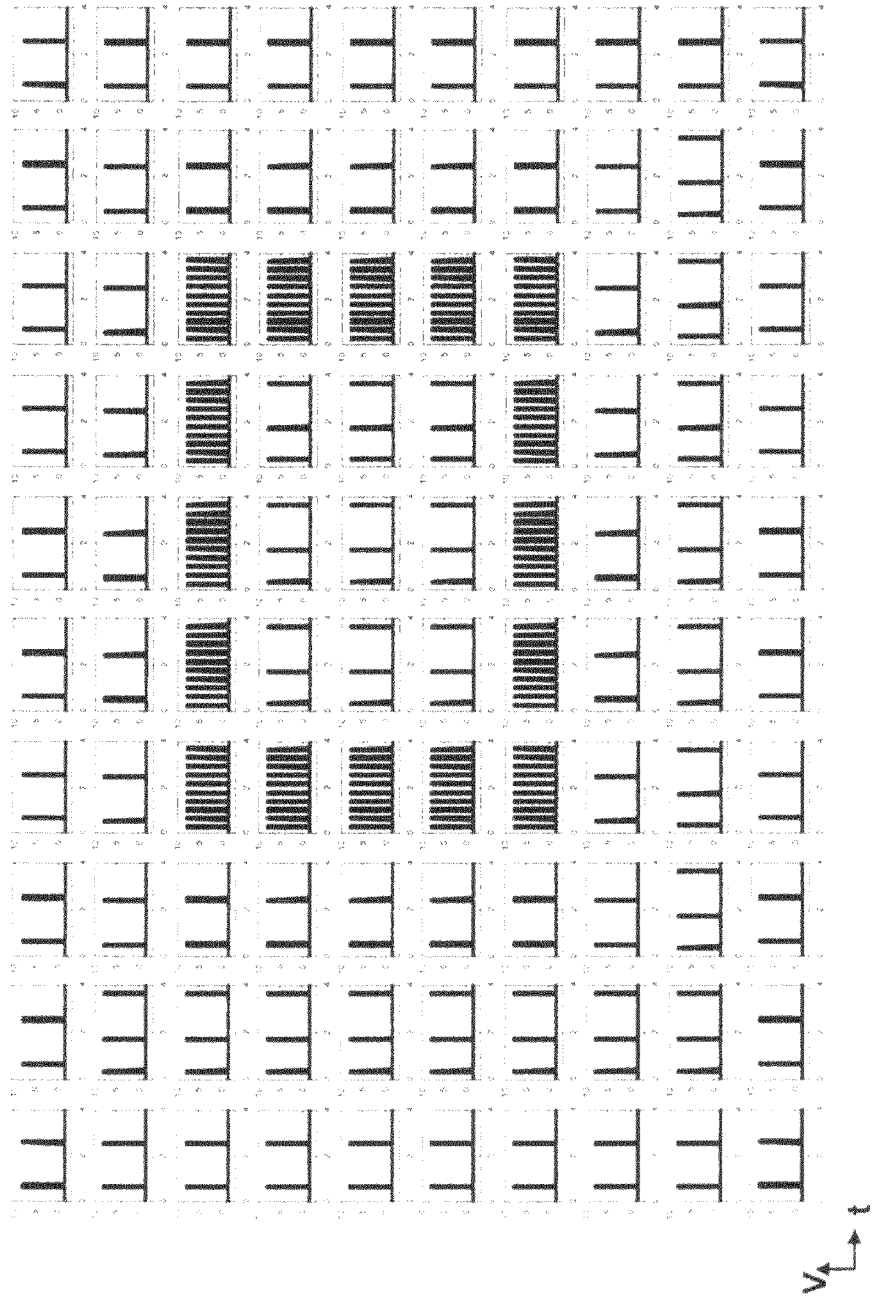
FIG. 7c shows the shows one hundred output spiking signals generated by the neural network.

FIG. 7c shows the shows one hundred output spiking signals generated by the neural network. It can be observed that 16 signals converge into a high spiking rate. These signals are produced by the 16 spiking cells detecting the desired edges.

Figure 7D:
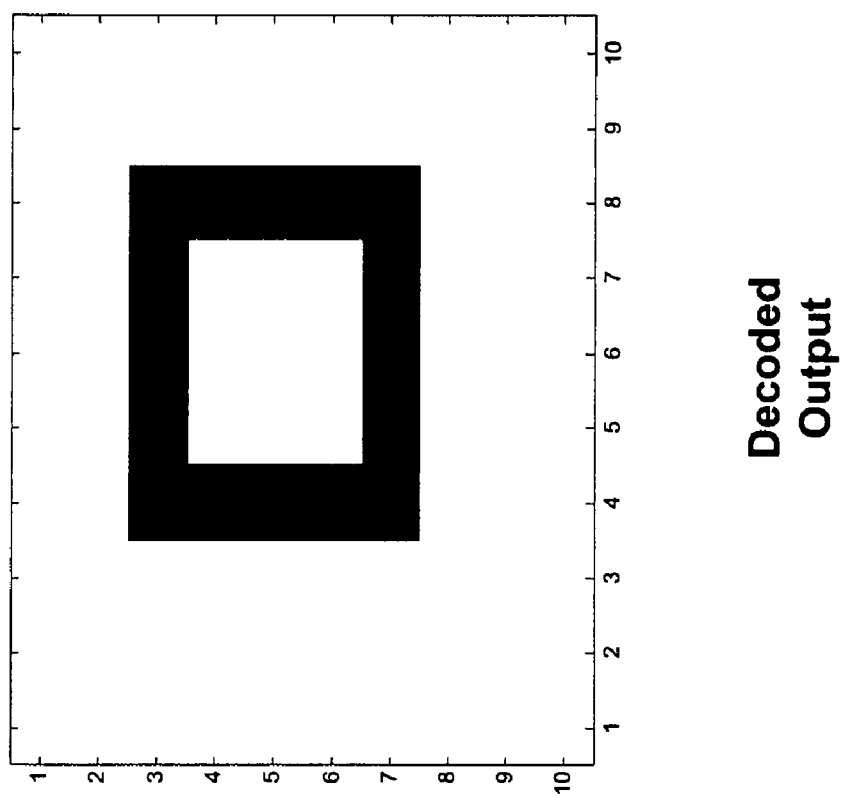
FIG. 7d shows the final map at the output of the recovery block.

FIG. 7d shows the final map at the output of the recovery block. This block uses as input the one hundred spiking signals of FIG. 7c.

Figure 7E:
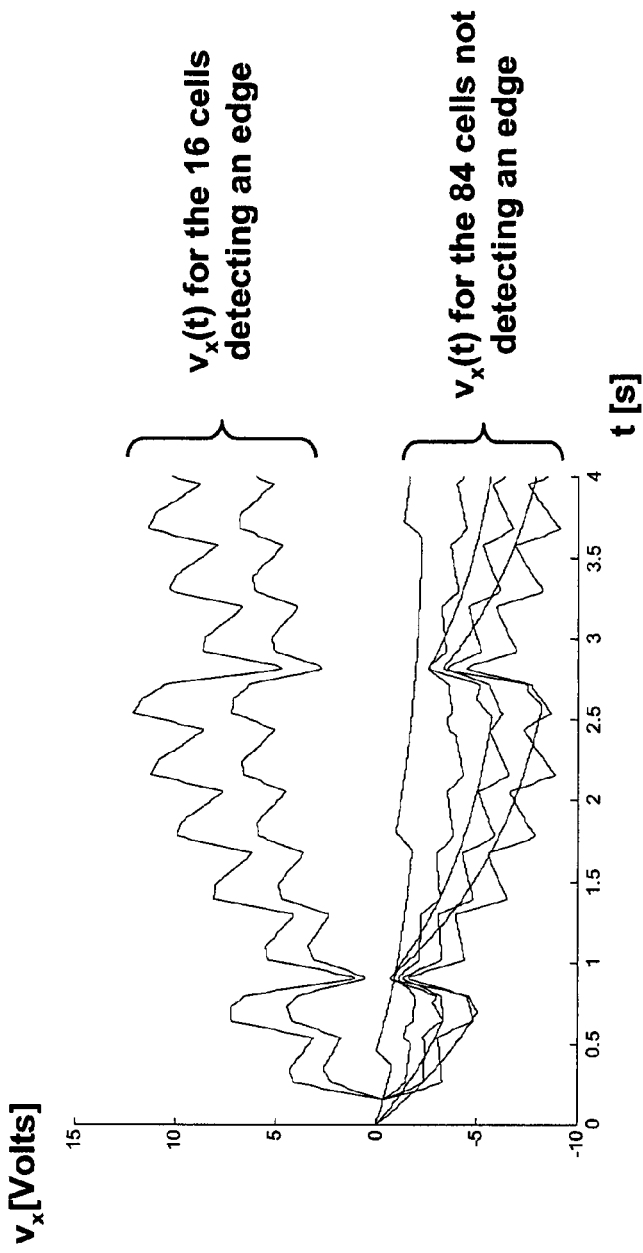
FIG. 7e shows in a single plot the $v_x(t)$ for all the processing cells.

All the signals between cells in the main neural network of one hundred cells are spiking signals. The only analog signals are the internal state voltages $v_x$. FIG. 7e shows in a single plot the $v_x(t)$ for all the one hundred processing cells 10 for the first 4 seconds. Only 16 $v_x(t)$ curves converge to a positive value. Those curves are associated with the cells detecting the desired edge feature.

According to our simulations the spiking network can do all the processing tasks of cellular neural networks. Unlike cellular neural networks our new network does not need to use linear analog amplifiers. Analog amplifiers are difficult to implement in VLSI with high linearity. Our new circuit relies in simple 1-bit DACs that are inherently linear. In addition 1-bit DACs are extremely compact when implemented in VLSI.

FIGS. 8 and 8a to 8g show an example of a simulation of the pulse-domain neural processor. In this example the pulse-domain neural processor is used to detect the same object in a two dimensional input map as in the case of the simulation of FIGS. 6a-6g. This simulation is again based on an embodiment of a neural network with one hundred processing cells 10.

Figure 8A:
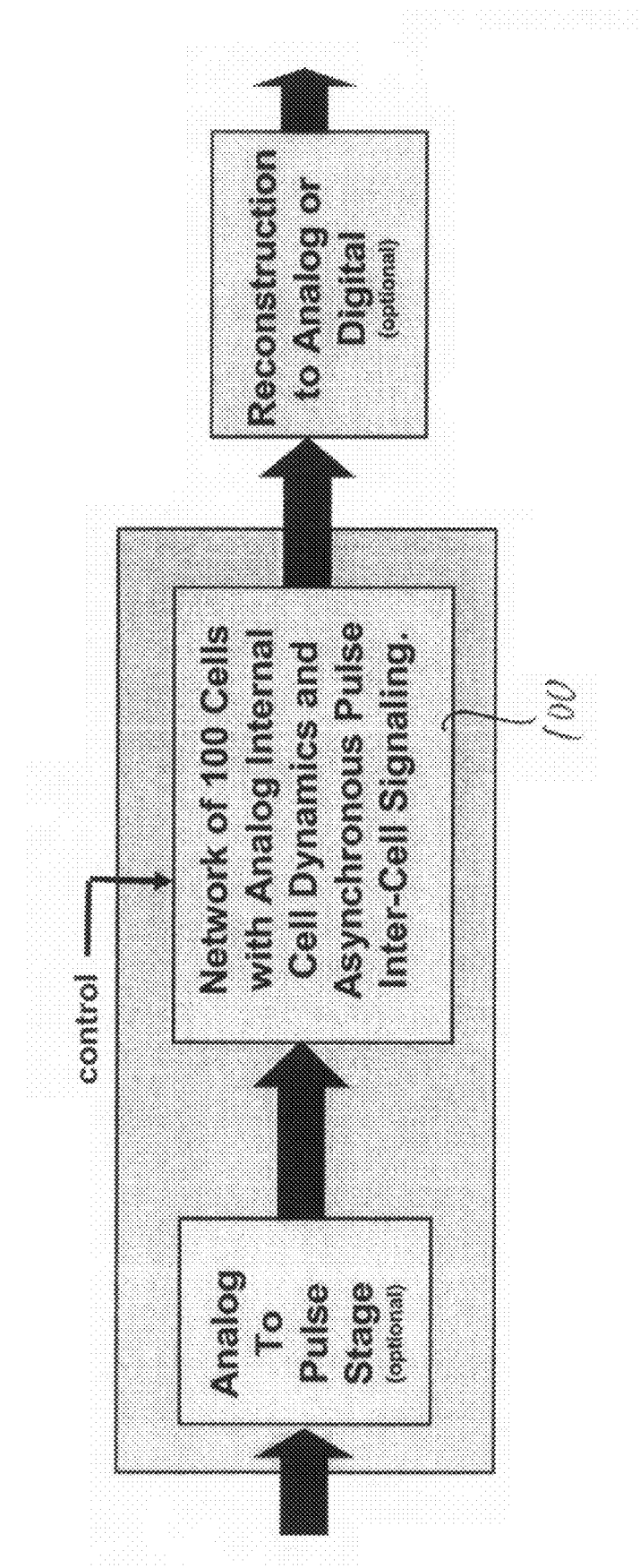
FIG. 8a shows a diagram of the setup for the simulation discussed with reference to FIGS. 8 and 8b-8g.

FIG. 8a shows a diagram of the setup for the simulation of the pulse-domain processor of this invention. It is composed of: (1) an optional analog to pulse stage, (2) the main pulse-domain processing network 100 with one hundred cells in this simulation embodiment, and (3) an optional reconstruction block.

The optional analog to pulse stage could comprise an array of elements 110' similar to that shown by FIG. 6a-1, except that the elements 110 shown in that figure would be replaced by elements 110' described with reference to FIG. 5b. The optional reconstruction to analog or digital stage may be implemented, for example, in the manner previously described with reference to FIGS. 6a and 6a-2.

The pulse version of the processing cell 10 can do the same processing tasks as the spiking version thereof. As an example the simulation results of the pulse-domain neural network using the same input data as used in the first simulation example of the spike-domain network discussed above with reference to FIGS. 6 and 6a-6g is now briefly described.

Figures 8B, 8C:
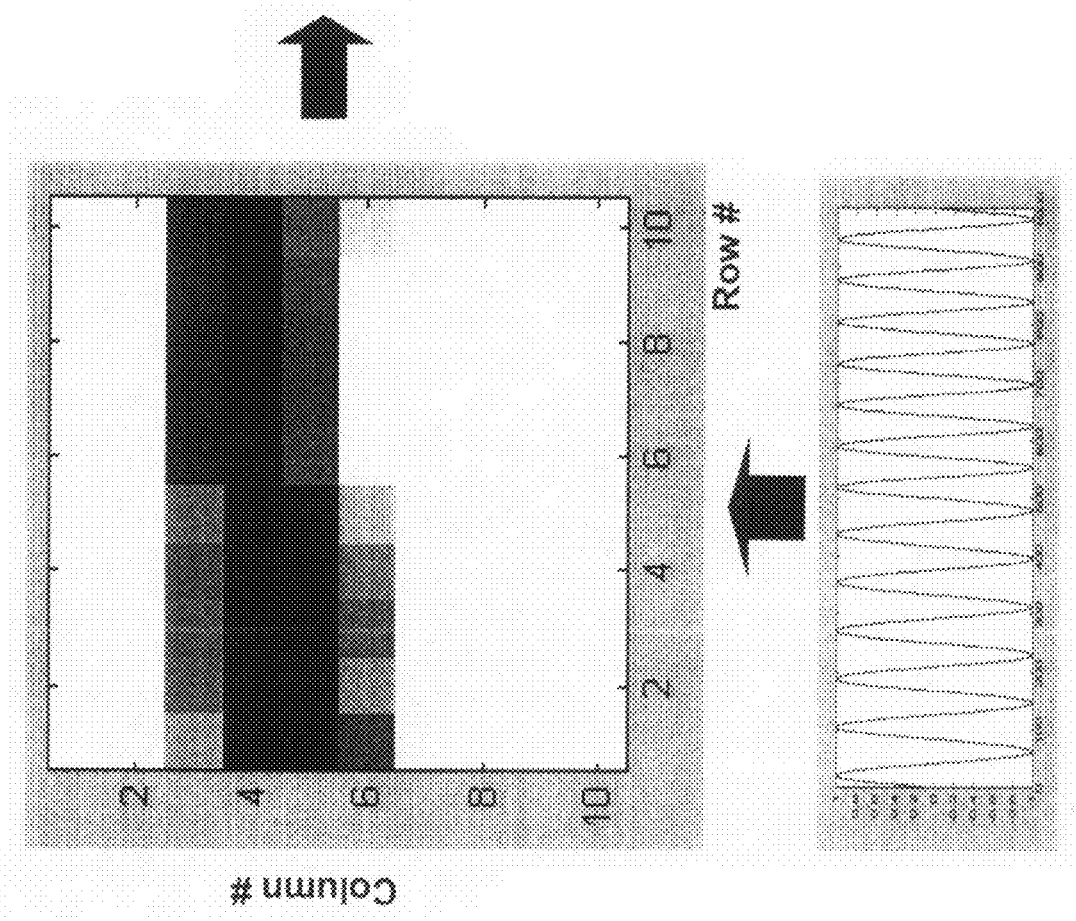
FIG. 8b shows an example of a signal with a frequency discontinuity.
FIG. 8c shows a two-dimensional map (a wavelet map) associated with signal 8b.

FIG. 8b shows an example of a signal with a frequency discontinuity. FIG. 8c shows a two-dimensional map (a wavelet map) associated with signal 8b.

Figure 8D:
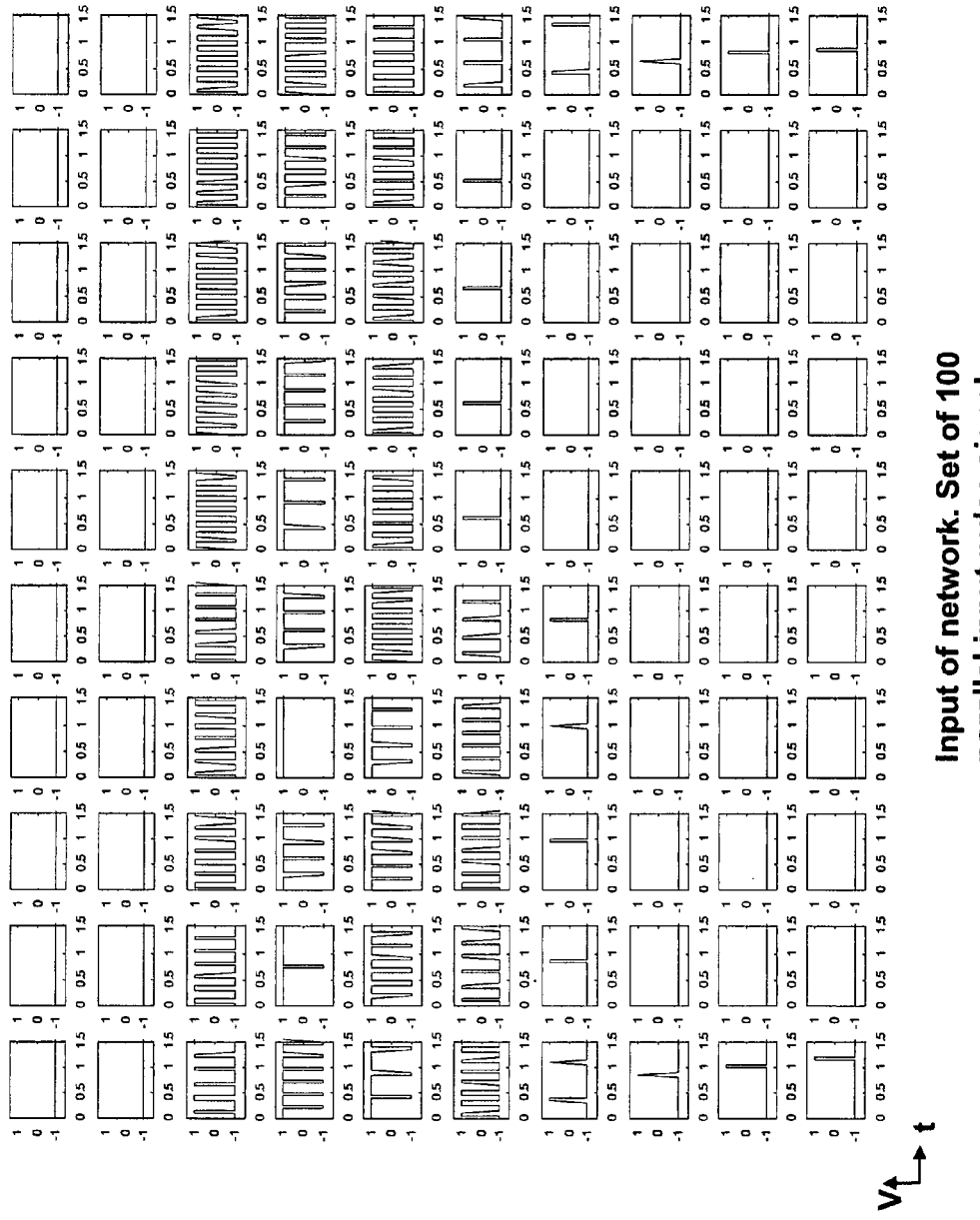
FIG. 8d shows a hundred pulse signals generated by the Analog-to-Pulse stage when the analog map of FIG. 8c is used as a steady state input.

FIG. 8d shows one hundred pulse signals generated by the Analog-to-Pulse stage when the analog map of FIG. 8c is used as a steady constant input. In FIG. 8d the one hundred signals are arranged into a 10×10 grid of plots. Each plot contains the pulse signal encoding the corresponding analog value of FIG. 8c during the first 1.5 seconds (using normalized units for the resistor and capacitor circuit elements of FIG. 3) of a simulation. All pulse signals can have only two possible values: +1V and −1V. However, the timing of the transition between these two values is not quantized. It can be observed that the dark areas of the analog map of FIG. 8c are mapped into pulse signals with long intervals at the positive +1V value and short intervals at the negative −1V value. The opposite occurs for light areas of the input map. The signals of FIG. 8d are used as external inputs for the neural network.

Figure 8E:
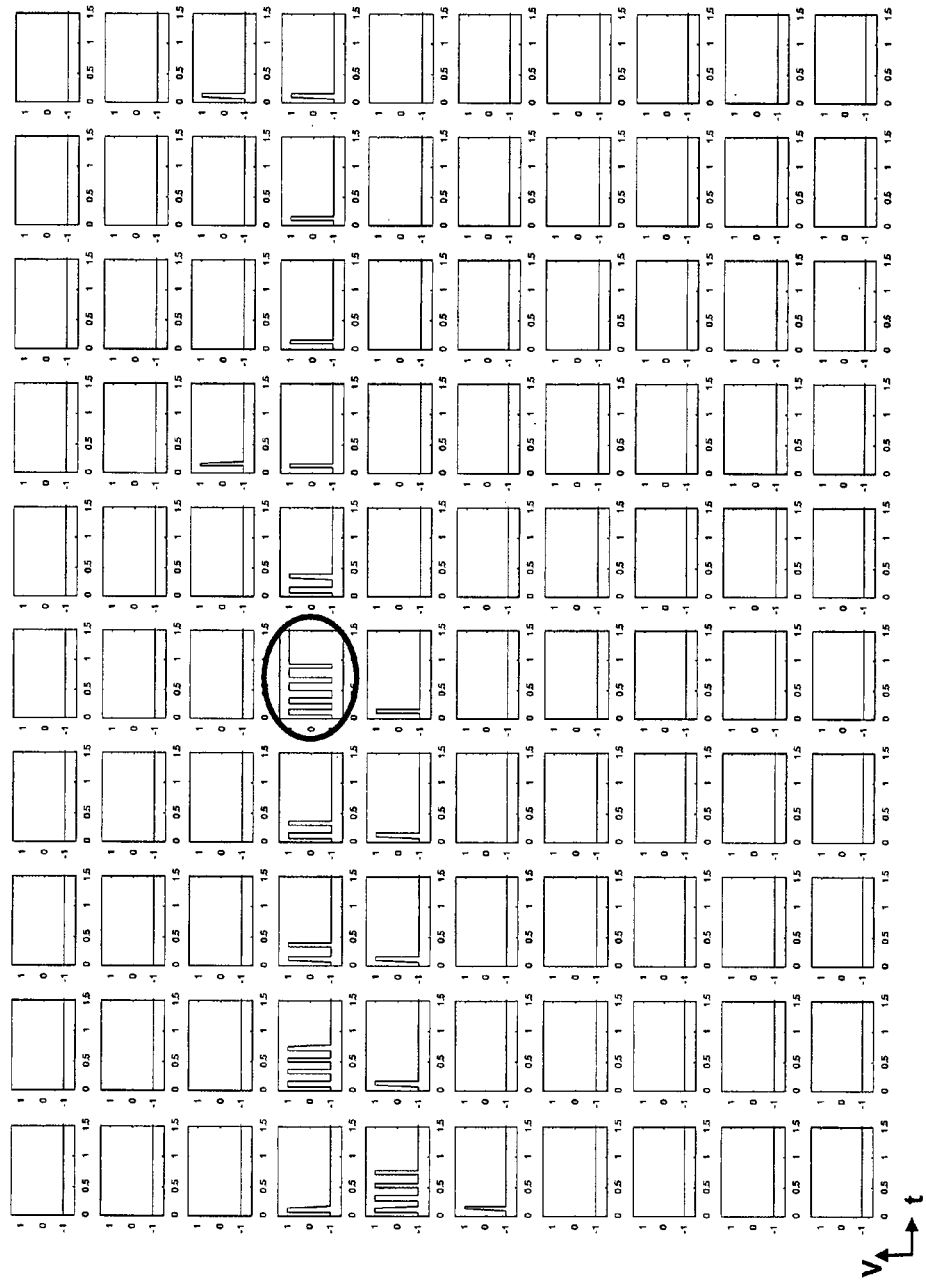
FIG. 8e shows the shows one hundred output pulse signals generated by the neural network.

FIG. 8e shows the shows one hundred output pulse signals generated by the neural network in this simulation. It can be observed that only one of the signals converges to a state with longer intervals at the positive +1V value than at the −1V value. This signal is produced by the cell detecting the desired feature. All the weighs for 1-bit DACs and for $I_B$ are the same as for the first example of the spiking network of FIG. 6. The analog current source $I_B$ can also be replaced in a second embodiment by a 1-bit DAC driven by analog to pulse encoder identical as the one shown in FIG. 5b, as discussed above. In this later case the analog input of the analog-to-pulse encoder is always a constant value and the weight of the new 1-bit DAC is controlled externally.

Figure 8F:
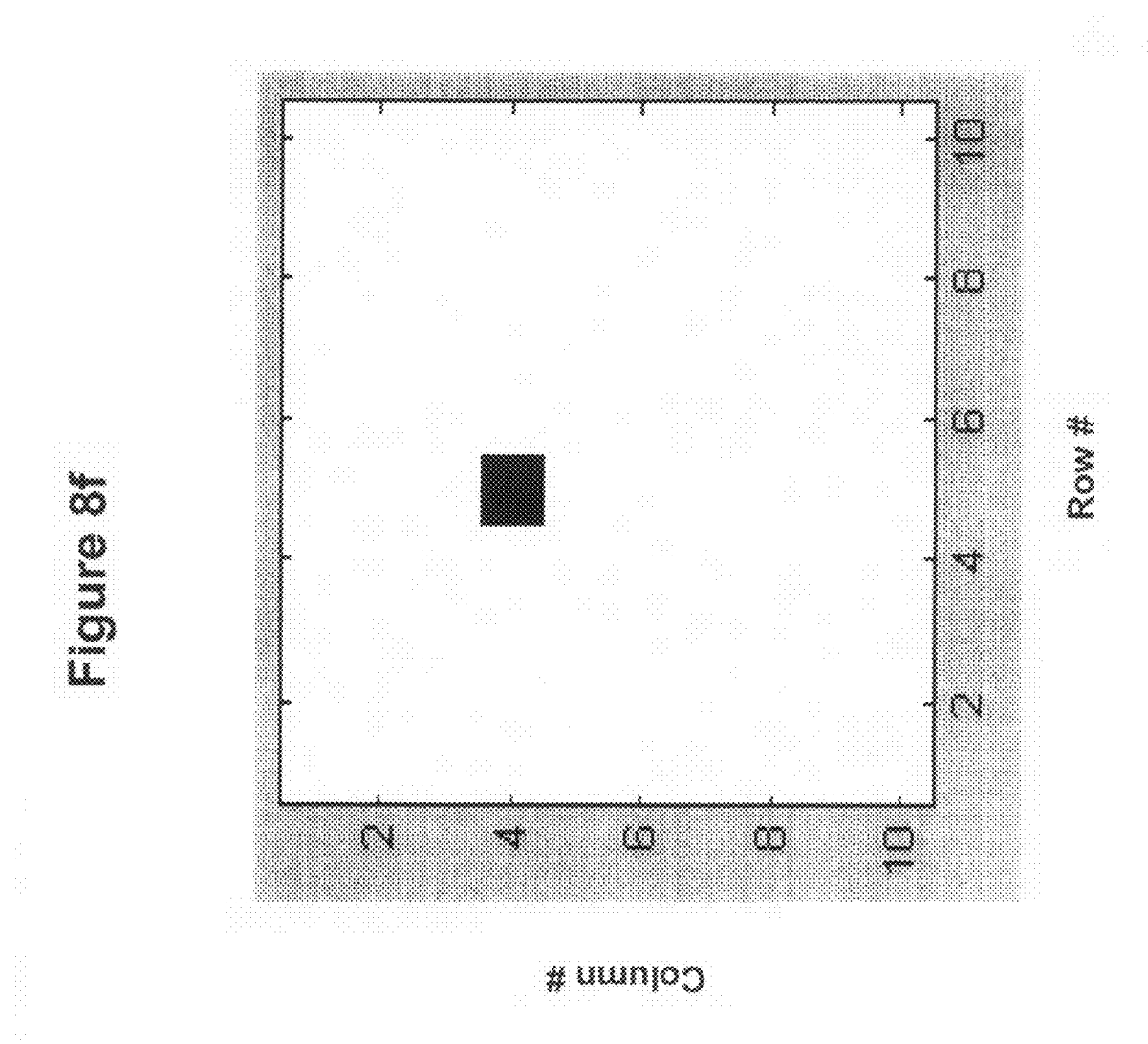
FIG. 8f shows the final map at the output of the recovery block in the simulation.

FIG. 8f shows the final map at the output of the recovery block. Only one of one hundred positions of the output map is black (value=+1). It represents the location of the desired feature.

All the signals between cells in the main network of one hundred cells are pulse signals. The only analog signals are the internal state voltages $v_x$. FIG. 8g shows in a single plot the $v_x(t)$ for all the one hundred cells for the first 20 seconds. Only one $v_x(t)$ curve converges to a positive value. That curve is associated with the cell detecting the desired feature. The convergence of a $v_x(t)$ to a positive or a negative value happens approximately in just one second (using normalized units for the resistor and capacitor elements of FIG. 5.)

In the examples of FIGS. 6-8 the target output can be obtained in a time scale of just a few spikes or pulses, as the case may be.

The network task is programmed a priori with no training necessary. The network can solve the processing tasks that can be implemented in fully-analog networks such as cellular neural networks (see the article in Cellular Neural Networks and Analog VLSI noted above), but without the need to use accuracy-limiting analog amplifiers. The new network operates on spiking signals. This enables the use of simple, and intrinsically linear, 1-bit asynchronous DACs inside the cells instead than analog amplifiers.

The circuit is well suited for high speed operation. As an example, using a fast current IC technology in InP, the typical inter-spike time interval is lower than 100 ps. Using this technology circuit can process in parallel an entire input map in less than 1 ns.

What is claimed is:

1. A neural network comprising:
an array of interconnected processors, each processor operating in either the pulse domain or spike domain, and each said processor having:
first inputs selectively coupled to other processors in said array of interconnected processors, each first input having an associated 1 bit DAC coupled to a summing node,
second inputs selectively coupled to inputs of the neural network, the second inputs having current generators associated therewith coupled to said summing node,
a filter/integrator for generating an analog signal corresponding to current arriving at the summing node,
if the processors operate in the pulse domain, an analog-to-pulse converter for converting an analog signal derived either directly from the filter/integrator or via a non-linear element, to the pulse domain, and providing the converted analog signal as an unquantized pulse domain signal at an output of each processor operating in the pulse domain;
if the processors operate in the spike domain, an analog-to-spike converter for converting an analog signal derived either directly from the filter/integrator or via a non-linear element, to the spike domain, and providing the converted analog signal as an unquantized spike domain signal at an output of each processor operating in the spike domain;
wherein the array of interconnected processors are selectively interconnected with either unquantized pulse domain or spike domain signals.

2. The neural network of claim 1 wherein each current generator associated with the second inputs comprise a 1-bit DAC.

3. The neural network of claim 2 wherein the 1 bit DACs associated with the first and second inputs have adjustable gains.

4. The neural network of claim 3 wherein the interconnection of the array of interconnected processors is effected selectively and the gains of the 1 bit DACs are adjusted selectively to control a nature of a problem solved by the neural network.

5. The neural network of claim 4 further including a bias generator operatively connected to the summing node.

6. The neural network of claim 5 wherein the bias generator comprises a current source.

7. The neural network of claim 5 wherein the bias generator comprises a voltage source and either an analog to pulse converter when the array of interconnected processors operate in the pulse domain or an analog to spike converter when the array of interconnected processors operate in the spike domain.

8. The neural network of claim 1 wherein the analog-to-pulse converter comprises a time encoder having a summing node, an integrator having an input coupled to an output of the summing node and a hysteresis quantizer coupled to an output of the integrator, the hysteresis quantizer having an output proving an output of the time encoder and providing an input to the summing node, the summing node also providing an input to the time encoder.

9. The neural network of claim 1 wherein the analog-to-spike converter comprises a spike time encoder having a summing node, an integrator having an input coupled to an output of the summing node, a hysteresis quantizer coupled to an output of the integrator, an edge to spike convertor coupled to an output of the hysteresis quantizer, the edge to spike convertor having an output proving an output of the time encoder and providing an input to the summing node, the summing node also providing an input to the spike time encoder.

10. The neural network of claim 1 wherein a nonlinear element is coupled to the filter/integrator.

11. A neural network comprising:
an array of interconnected processors, each processor operating in the pulse domain, and each said processor having:
first inputs selectively coupled to other processors in said array of interconnected processors, each first input having an associated 1 bit DAC coupled to a summing node,
second inputs selectively coupled to inputs of the neural network, the second inputs having current generators associated therewith coupled to said summing node,
a filter/integrator for generating an analog signal corresponding to current arriving at the summing node, and
an analog-to-pulse converter, for converting an analog signal, derived either directly from the filter/integrator or via a non-linear element, to the pulse domain, and providing the converted analog signal as an unquantized pulse domain signal at an output of the processor;
wherein the array of interconnected processors are selectively interconnected with unquantized pulse domain signals.

12. The neural network of claim 11 wherein each current generator associated with the second inputs comprise a 1-bit DAC.

13. The neural network of claim 12 wherein the 1 bit DACs associated with the first and second inputs have adjustable gains.

14. The neural network of claim 13 wherein the interconnection of the array of interconnected processors is effected selectively and the gains of the 1 bit DACs are adjusted selectively to control a nature of a problem solved by the neural network.

15. The neural network of claim 14 further including a bias generator operatively connected to the summing node.

16. The neural network of claim 11 wherein the analog-to-pulse converter comprises a time encoder having a summing node, an integrator having an input coupled to an output of the summing node and a hysteresis quantizer coupled to an output of the integrator, the hysteresis quantizer having an output proving an output of the time encoder and providing an input to the summing node, the summing node also providing an input to the time encoder.

17. A neural network comprising:
an array of interconnected processors, each processor operating in the spike domain, and each said processor having:
first inputs selectively coupled to other processors in said array of interconnected processors, each first input having an associated 1 bit DAC coupled to a summing node,
second inputs selectively coupled to inputs of the neural network, the second inputs having current generators associated therewith coupled to said summing node,
a filter/integrator for generating an analog signal corresponding to current arriving at the summing node, and
an analog-to-spike converter for converting an analog signal, derived either directly from the filter/integrator or via a non-linear element, to the spike domain, and providing the converted analog signal as an unquantized spike domain signal at an output of the processor;
wherein the array of interconnected processors are selectively interconnected with unquantized spike domain signals.

18. The neural network of claim 17 wherein each current generator associated with the second inputs comprise a 1-bit DAC.

19. The neural network of claim 18 wherein the 1 bit DACs associated with the first and second inputs have adjustable gains.

20. The neural network of claim 19 wherein the interconnection of the array of interconnected processors is effected selectively and the gains of the 1 bit DACs are adjusted selectively to control a nature of a problem solved by the neural network.

21. The neural network of claim 20 further including a bias generator operatively connected to the summing node.

22. The neural network of claim 17 wherein the analog-to-spike converter comprises a spike time encoder having a summing node, an integrator having an input coupled to an output of the summing node, a hysteresis quantizer coupled to an output of the integrator, an edge to spike convertor coupled to an output of the hysteresis quantizer, the edge to spike convertor having an output proving an output of the time encoder and providing an input to the summing node, the summing node also providing an input to the spike time encoder.

23. A neural network comprising:
an array of interconnected processors, at least one of said interconnected processors operating in the pulse domain, said at least one processor having:
at least one first input selectively coupled to other processors in said array of interconnected processors, the at least one first input having an associated 1 bit DAC coupled to a summing node,
at least one second input selectively coupled to inputs of the neural network, the at least one second input having a current generator associated therewith coupled to said summing node,
a filter/integrator for generating an analog signal corresponding to current arriving at the summing node, and
an analog-to-pulse converter, for converting an analog signal, derived either directly from the filter/integrator or via a non-linear element, to the pulse domain, and providing the converted analog signal as an unquantized pulse domain signal at an output of the at least one processor.

24. The neural network of claim 23 wherein the at least one current generator associated with the second inputs comprise a 1-bit DAC.

25. The neural network of claim 23 wherein the 1 bit DACs associated with the at least one first input and the at least one second input have adjustable gains.

26. The neural network of claim 25 wherein the interconnection of the array of interconnected processors is effected selectively and the gains of 1 bit DACs are adjusted selectively to control a nature of a problem solved by the neural network.

27. The neural network of claim 26 further including a bias generator operatively connected to the summing node.

28. The neural network of claim 23 wherein the analog-to-pulse converter comprises a time encoder having a summing node, an integrator having an input coupled to an output of the summing node and a hysteresis quantizer coupled to an output of the integrator, the hysteresis quantizer having an output proving an output of the time encoder and providing an input to the summing node, the summing node also providing an input to the time encoder.

29. A neural network comprising:
an array of interconnected processors, at least one of said interconnected processors operating in the spike domain, said at least one processor having:
at least one first input selectively coupled to other processors in said array of interconnected processors, said at least one first input having an associated 1 bit DAC coupled to a summing node,
at least one second input selectively coupled to inputs of the neural network, the at least one second input having a current generator associated therewith coupled to said summing node,
a filter/integrator for generating an analog signal corresponding to current arriving at the summing node, and
an analog-to-spike converter for converting an analog signal, derived either directly from the filter/integrator or via a non-linear element, to the spike domain, and providing the converted analog signal as an unquantized spike domain signal at an output of the processor.

30. The neural network of claim 29 wherein each current generator associated with the second inputs comprise a 1-bit DAC.

31. The neural network of claim 30 wherein the 1 bit DACs associated with the at least one first input and the at least one second input have adjustable gains.

32. The neural network of claim 31 wherein the interconnection of the array of interconnected processors is effected selectively and the gains of the 1 bit DACs are adjusted selectively to control a nature of a problem solved by the neural network.

33. The neural network of claim 32 further including a bias generator operatively connected to the summing node.

34. The neural network of claim 29 wherein the analog-to-spike converter comprises a spike time encoder having a summing node, an integrator having an input coupled to an output of the summing node, a hysteresis quantizer coupled to an output of the integrator, an edge to spike convertor coupled to an output of the hysteresis quantizer, the edge to spike convertor having an output proving an output of the time encoder and providing an input to the summing node, the summing node also providing an input to the spike time encoder.

* * * * *